(12) United States Patent
Wyner et al.

(10) Patent No.: US 11,288,976 B2
(45) Date of Patent: Mar. 29, 2022

(54) LANGUAGE FLUENCY SYSTEM

(71) Applicant: FLUENT FOREVER, INC., Studio City, CA (US)

(72) Inventors: Gabriel Wyner, Chicago, IL (US); Yisrael Y. Lowenstein, Beit Shemesh (IL); John Rush, Snohomish, WA (US); James Stabbert, Puyallup, WA (US)

(73) Assignee: Fluent Forever Inc., Chicago, IL (US)

( * ) Notice: Subject to any disclaimer, the term of this patent is extended or adjusted under 35 U.S.C. 154(b) by 720 days.

(21) Appl. No.: 16/151,650

(22) Filed: Oct. 4, 2018

(65) Prior Publication Data

US 2019/0108773 A1    Apr. 11, 2019

Related U.S. Application Data

(60) Provisional application No. 62/568,558, filed on Oct. 5, 2017.

(51) Int. Cl.
| | |
|---|---|
| *G09B 19/06* | (2006.01) |
| *G06F 16/338* | (2019.01) |
| *G06F 16/951* | (2019.01) |
| *G06F 16/58* | (2019.01) |
| *G06F 40/123* | (2020.01) |

(52) U.S. Cl.
CPC ........... *G09B 19/06* (2013.01); *G06F 16/338* (2019.01); *G06F 16/5866* (2019.01); *G06F 16/951* (2019.01); *G06F 40/123* (2020.01)

(58) Field of Classification Search
CPC ... G09B 19/06; G06F 16/338; G06F 16/5866; G06F 16/951; G06F 40/123
See application file for complete search history.

(56) References Cited

U.S. PATENT DOCUMENTS

| | | | |
|---|---|---|---|
| 6,305,942 B1 | 10/2001 | Block et al. | |
| 6,328,569 B1 | 12/2001 | Jenkins et al. | |
| 6,755,657 B1 | 6/2004 | Wasowicz | |
| 7,051,019 B1 * | 5/2006 | Land | G06F 16/58 |
| 7,052,278 B2 | 5/2006 | Johnson et al. | |
| 7,101,185 B2 | 9/2006 | Budra et al. | |

(Continued)

FOREIGN PATENT DOCUMENTS

| | | |
|---|---|---|
| CN | 1518731 A | 8/2004 |
| CN | 101383101 A | 3/2009 |

(Continued)

OTHER PUBLICATIONS

Key To Korean, Increase Listening Comprehension by Training your Brain with Minimal Pairs, http://keytokorean.com, Jun. 29, 2015.

(Continued)

*Primary Examiner* — Eddy Saint-Vil
(74) *Attorney, Agent, or Firm* — DLA Piper LLP (US)

(57) ABSTRACT

A computerized method and system for teaching foreign language. Users can define flashcards for study words and words in study sentences and select associated images to be shown with the flashcards during review. An improved method and system for identifying and searching for images to show is provided. Improved methods for presenting flashcards for words with multiple definitions and improved database architecture for storing flashcard data for plural users is also provided.

17 Claims, 28 Drawing Sheets

(56) References Cited

U.S. PATENT DOCUMENTS

| | | | |
|---|---|---|---|
| 7,257,366 B2 | 8/2007 | Maldonado et al. | |
| 7,401,018 B2 | 7/2008 | Yamada et al. | |
| 7,563,099 B1 | 7/2009 | Iftikhar | |
| 8,083,523 B2 | 12/2011 | De Ley et al. | |
| 8,108,786 B2 | 1/2012 | Tucci | |
| 8,429,173 B1* | 4/2013 | Rosenberg | G06F 16/14 707/748 |
| 8,684,740 B2 | 4/2014 | Jenkins et al. | |
| 8,777,626 B2 | 7/2014 | Levy et al. | |
| 8,784,108 B2 | 7/2014 | Dohring et al. | |
| 9,043,195 B2 | 5/2015 | Paris | |
| 9,058,751 B2 | 6/2015 | Dohring et al. | |
| 2002/0182571 A1 | 12/2002 | McCormick et al. | |
| 2005/0017453 A1 | 1/2005 | Rehbein et al. | |
| 2005/0181336 A1 | 8/2005 | Bakalian | |
| 2007/0231776 A1* | 10/2007 | Saldutti | G09B 19/04 434/129 |
| 2008/0052126 A1 | 2/2008 | Sasai et al. | |
| 2010/0105015 A1 | 4/2010 | Ravin et al. | |
| 2010/0216099 A1* | 8/2010 | Gray | G09B 17/00 434/129 |
| 2010/0248194 A1* | 9/2010 | Renduchintala | G09B 5/02 434/169 |
| 2011/0191328 A1* | 8/2011 | Vernon | G06F 16/951 707/723 |
| 2011/0212430 A1 | 9/2011 | Smithmier et al. | |
| 2011/0318723 A1* | 12/2011 | Jeong | G09B 7/08 434/350 |
| 2012/0129142 A1 | 5/2012 | Yoon | |
| 2012/0156659 A1 | 6/2012 | Fun | |
| 2013/0143184 A1 | 6/2013 | Neikrug et al. | |
| 2013/0282360 A1 | 10/2013 | Shimota et al. | |
| 2014/0108898 A1* | 4/2014 | Kang | G06F 16/951 715/202 |
| 2014/0134576 A1* | 5/2014 | Edge | G09B 19/04 434/157 |
| 2014/0162243 A1* | 6/2014 | Lamkin | G09B 7/02 434/365 |
| 2014/0356821 A1* | 12/2014 | Krom | G09B 5/02 434/176 |
| 2015/0010889 A1 | 1/2015 | Wee | |
| 2015/0254999 A1* | 9/2015 | Goll | G09B 5/06 434/169 |
| 2016/0042661 A1 | 2/2016 | Minkoff et al. | |
| 2016/0225272 A1 | 8/2016 | Shea | |
| 2017/0046971 A1 | 2/2017 | Moreno | |
| 2017/0084198 A1 | 3/2017 | Thitithamasak | |
| 2017/0084199 A1 | 3/2017 | Lisitsa et al. | |
| 2017/0323576 A1* | 11/2017 | Ghatare | G09B 5/08 |
| 2018/0011611 A1* | 1/2018 | Pagaime da Silva | G06F 16/248 |
| 2018/0039638 A1* | 2/2018 | Krivokon | G06F 16/3322 |
| 2018/0158365 A1* | 6/2018 | Roche | G09B 17/003 |

FOREIGN PATENT DOCUMENTS

| | | |
|---|---|---|
| CN | 101558434 A | 10/2009 |
| CN | 102567626 A | 7/2012 |
| CN | 103080991 A | 5/2013 |
| CN | 103714724 A | 4/2014 |
| CN | 104021326 A | 9/2014 |
| CN | 106897950 A | 6/2017 |
| JP | 2002-23614 A | 1/2002 |
| WO | 2014084870 A1 | 6/2014 |
| WO | 2014131194 A1 | 9/2014 |

OTHER PUBLICATIONS

Simone Gaiarin, Fluent Forever: two possible improvements, http://simgunz.org, Apr. 9, 2015.

Andrew D. Cohen, The Use of Verbal and Imagery Mnemonics in Second-Language Vocabulary Learning, Hebrew University of Jerusalem, 1987 Cambridge University Press, pp. 43-61.

Gabriel Wyner, How to Learn Any Language Fast and Never Forget It, (E-Book), Harmony Books, New York, Published by Harmony Books, New York an imprint of the Crown Publishing Group, a division of Random House LLC, a Penguin Random House Company, New York, 2014.

International Search Report, US Patent and Trademark Office, Application No. PCT/US2018/054376, dated Feb. 8, 2019.

Written Opinion of the International Searching Authority, US Patent and Trademark Office, Application No. PCT/US2018/054376, dated Feb. 8, 2019.

Teng Xie et al., "The Influence of Different Presentation Modes and Orders on English Word Learning", Journal of Heihe University, pp. 156-157, Sep. 30, 2016.

Office Action in Chinese Patent Application No. 201880065106.6, dated May 8, 2021.

Examination Report in Indian Patent Application No. 202047018856, dated Sep. 2, 2021.

* cited by examiner

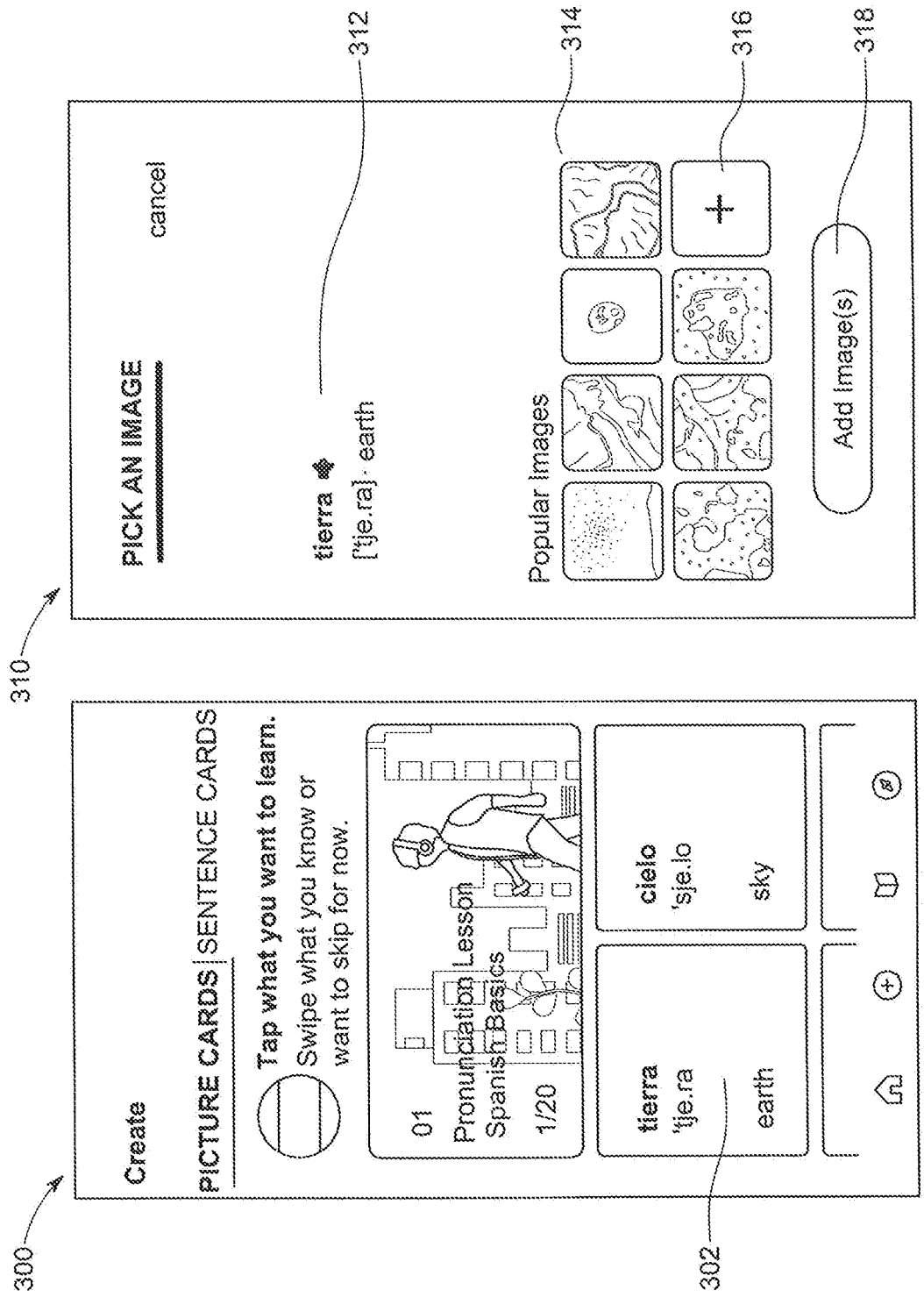

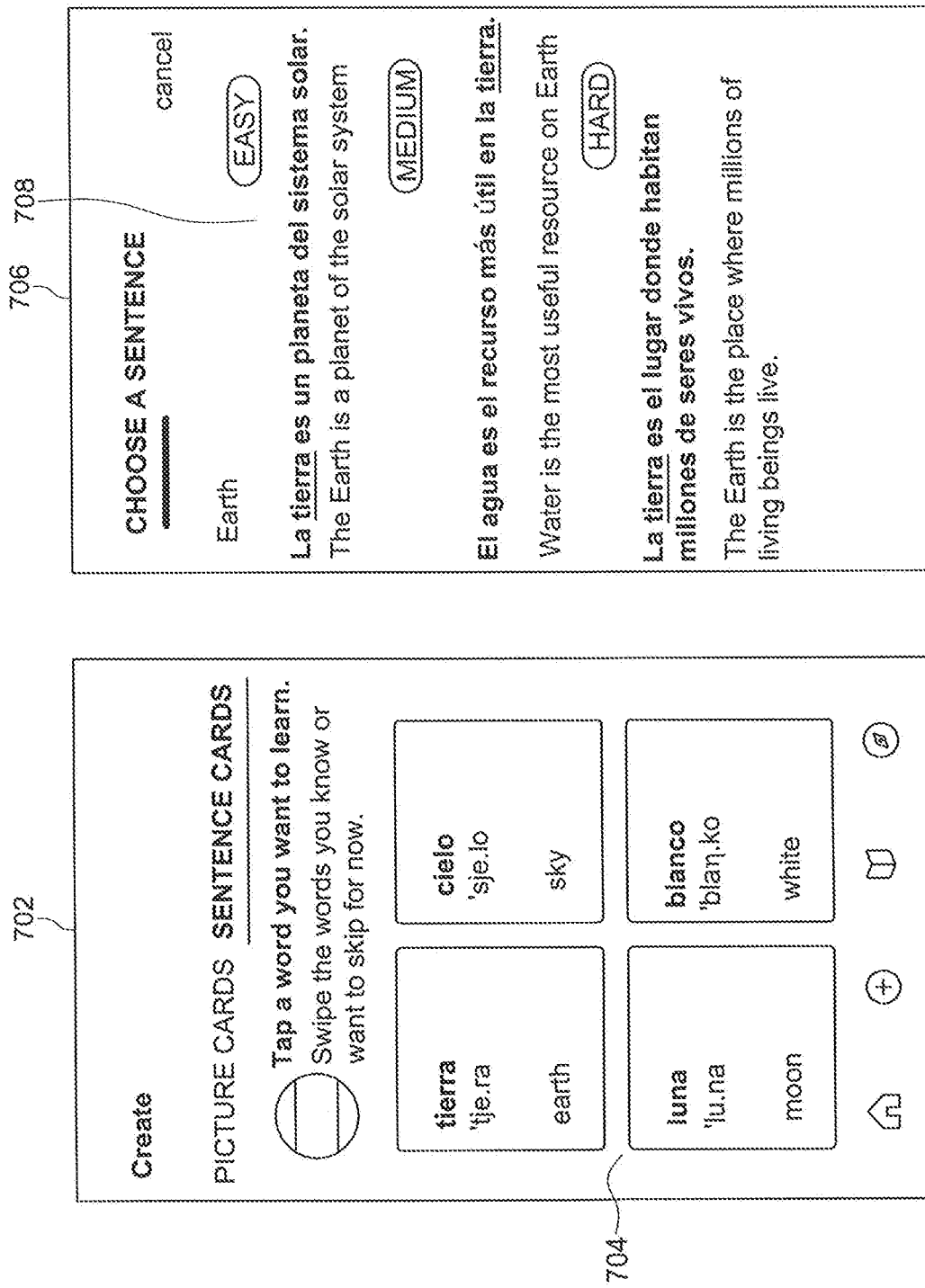

```
{                              {                           {
  "625_word": "gracias",         "pre_learn": " ",           "pre_learn": "",
  "difficulty": "easy",          "post_learn": " ",          "post_learn": " ",
  "learn": "\"Gracias,\" le dijo a    "start": 14,                "start": 26,
ella en Puerto Rico.",           "end": 18,                  "end": 28,
  "vulgar": false,               "learn": "dijo",            "learn": "en",
  "known": "\"Thank you,\" he told    "known": "said",            "known": "in",
her in Puerto Rico.",            "root": "dijo",             "root": "en",
  "audio_url":                   "tags": [ ],                "tags": [ ],
"sentence_gracias_easy.mp3",     "abstract": false,          "abstract": true,
  "words": [                     "vulgar": false,            "vulgar": false,
    {                            "child_index": null         "child_index": null
      "pre_learn": "\" ",      },                          },
      "post_learn": ",\" ",    {                           {
      "start": 1,                "pre_learn": " ",           "pre_learn": " ",
      "end": 8,                  "post_learn": " ",          "post_learn": ". ",
      "learn": "Gracias",        "start": 19,                "start": 29,
      "known": "thanks",         "end": 20,                  "end": 40,
      "root": "gracia",          "learn": "a",               "learn": "Puerto Rico",
      "tags": [ ],               "known": "to",              "known": "Puerto Rico",
      "abstract": false,         "root": "a",                "root": "Puerto Rico",
      "vulgar": false,           "tags": [ ],                "tags": [ ],
      "child_index": null        "abstract": true,           "abstract": false,
    },                           "vulgar": false,            "vulgar": false,
    {                            "child_index": null         "child_index": null
      "pre_learn": " ",        },                          }
      "post_learn": " ",       {                           ],
      "start": 11,               "pre_learn": " ",           "lang_pack": "en-US_en-ES"
      "end": 13,                 "post_learn": " ",        }
      "learn": "le",             "start": 21,
      "known": "him",            "end": 25,
      "root": "le",              "learn": "ella",
      "tags": [ ],               "known": "she",
      "abstract": true,          "root": "ella",
      "vulgar": false,           "tags": [ ],
      "child_index": null        "abstract": true,
    },                           "vulgar": false,
                                 "child_index": null
                               },
```

FIG. 11

Fluent Forever          ◯ Spanish ▾   ◉ nelson_vasconcelos ▾

Create new sentence
① Write sentence — ② Organize words — ③ Translation

For a better translation, separate every different word with the help of the pins.

|"|>|G|r|a|c|i|a|s|<|,|"|  |>|l|l|e|<|  |>|d|i|j|o|<|  |>|a|<|  |>|e|l|l|l|a|<|  |>|e|n|<|  |>|P|u|e|r|t|o|<|  |>|R|i|c|o|<|.|

[Data: (click to show)]

Drag the pins to separate the words.
To delete a pin, drag it outside of the box.
To create one, click anywhere inside the box.

Drag the pin to the trash to delete it ( Back )                                              ( Next Step )

LANGUAGE FLUENCY SYSTEM

CROSS REFERENCE TO RELATED APPLICATIONS

This application claims priority to U.S. Provisional patent application No. 62/568,558 filed on Oct. 5, 2017, the entire contents of which is expressly incorporated by reference.

FIELD OF THE INVENTION

The present invention relates to a system for teaching language fluency and, more specifically, relates to a software based system for teaching foreign languages.

BACKGROUND

Computer based programs for helping a person learn a foreign language are well known. These programs take many different approaches, from simple drills using rote repetition to language immersion with speech recognition to help with pronunciation. One common approach to language instruction involves flashcards. A typical flashcard has a native language word or phrase on one side and the corresponding foreign word or phrase on the other. A student can work their way through sets of cards in increasing difficulty as they progress.

There are many different approaches to selecting the order and content of flashcards and in approaching a language learning process. One particular technique is set forth in the book "*Fluent Forever—How to Learn Any Language Fast and Never Forget It*", G. Wyner (2014) and an associated pronunciation app.

To help reinforce the meaning of a word, cards can be provided with a picture in lieu of or in addition to the native word or phrase and where the picture is selected to illustrate the meaning of the word or phrase. Printed cards can come with a predefined set of pictures. Conventional computer-based language learning software can also include a pre-defined set of pictures. For homemade cards, the user can draw their own pictures or manually generate search parameters to search for a picture on the internet using a public or private GIS (graphic image search) tool. Computer-based software also will frequently have sound recordings of the proper pronunciation of the word or phrase that can play automatically or on demand when the corresponding text is shown.

One problem with conventional systems for teaching language fluency is the static nature of the picture set that is associated with example words, phrases, and sentences. Printed and computerized language resources have pictures selected in advance for distribution to students. Generating the appropriate set of pictures may require expending relatively substantial resources, particularly when pictures are needed for hundreds or even thousands of different words, phrases, and sentences. In addition, while significant care may be put into picking an appropriate image, the image for a given word may not resonate across every member of the group of students. This issue is particularly true for selection of pictures to represent the meaning of abstract words or phrases. Similar problems arise in selection of pictures to show for words that have multiple meanings based on context and, more generally, in the generation, processing, and supported interactions with actual or near homonyms and homophones.

There is a need for an improved and flexible system for providing image data in conjunction with text and audio as part of a computerized language fluency system which provides more accurate and appropriate images a user can select for use with digital flashcard to teach words and phrases.

There is a further need to provide an improved and flexible language fluency system that supports a large number of individual words and sentences and stores information for many different users in a common database, and in a way that allows words and sentences and related flashcards to be stored in an on-line database available to multiple users in a manner that can be shared easily among users as they customize their own electronic flashcards, and where the database and system is configured to reduce excessive on-line and local storage demands.

SUMMARY

These and other objects are provided by a language fluency method and system in which, in one embodiment, a server includes a database that has information about words and sentences that can be learned and further information for each user to identify specific words and flashcards for that user. A flashcard app on a client device can be used to define flashcards for selected words and sentences.

In building a flashcard, the server provides the user's app with a list of words for which flashcards can be generated. Using the app, a user can select a particular word. The flashcard can be for the isolated word or use of the word in a given sentence. For a sentence word, the server provides the client with one or more sentences that contain the selected word and the selects the sentence they want to proceed with.

The app queries the server for recommended pictures for that word, in the context of the sentence if appropriate. The server selects recommended pictures based on pictures previously selected by other system users for that word or that word in the context of the sentence. Links to the recommended pictures are returned to the client. In addition, or alternatively, the server can also generate an image search query and issue it to an image search engine. Recommended pictures are selected by the server from returned search results and links to those recommended pictures are returned to the client.

In a particular embodiment, when the server generates a search query for a word in a sentence the query is formed using a root form of the word and not the actual word in the sentence. In addition, various words to be learned, such as in the context of a sentence, can be flagged as being abstract. When generating a generated image search query for a word flagged as abstract, the query is built using one or more other words in the sentence and/or the root forms thereof.

The recommended pictures are displayed on the client device and the user can select one or more to use with the flashcard being defined for that word and/or word in the sentence. If the user does not like any of the selected words, they can build a custom image search query. In one embodiment, the query can be built by the user selecting one or more words in the sentence (in the foreign and/or native language), e.g., by tapping them if a touchscreen display is present, or otherwise selecting them by mouse clicks or other input means. Query terms can also be typed. The custom query can be sent to the server which will then issue it to the image search engine. The server can return search results to the client which displays the images for selection.

In addition to selecting images for use with flashcards, various other meta-data can be defined which can impact how flashcards are displayed. This data can include tags to classify a given word according to gender, part of speech, or other category. Various visual attributes of a flashcard can be altered when the flashcard is displayed based on such tags. In an embodiment, the user can select these.

In an embodiment, when the user initiates a flashcard review on their app, the server can be queried to select a set of words and/or flashcards to review. The server retrieves the associated flashcard data from the database, including user-selected image data, defined tags, and other information, and sends the flashcard records to the client device. The app can then display the flashcards to allow the user to learn the designated words.

In some cases a user may define multiple flashcards for the same word, wherein the front side of the cards are the same but the back sides are different. For example, a word may have two different meanings in different contexts. When such flashcards are defined, the new cards can be automatically linked to the old ones in the database. In an embodiment, the app displays such linked cards in a multi-back flashcard presentation. One side of the flashcard has the designated word. When the user indicates the flashcard should be flipped, the other side of the flashcard is comprised of a combination of the backs of the linked cards.

The database can contain records for a predefined list of words to learn, sentences using those words and translations. It can also contain records detailing the various flashcards that have been defined by the users, records of selected images for those cards, and other data. In a particular embodiment, a specific hierarchical database structure is used which reduces duplication of word, sentence, tag, image, and other data in the database when setting up sentence cards, word cards, tags, and other information for each user and where the database is used to store a large volume of custom flashcard information for a large number of users. The database object linking is bi-directional making it easy to both identify flashcards for a given user and to execute searches, for example, searching for all sentences that have a specific word and searching for all images that users have associated with a given word.

These and other embodiments of the invention are addressed in more detail below with reference to the figures and the detailed description.

BRIEF DESCRIPTION OF THE FIGURES

Various features and advantages of the invention, as well as structure and operation of various implementations of the invention, are disclosed in detail below with references to the accompanying drawings, in which:

FIGS. 3A-3D show example displays of a word flashcard creation screen and picture selection screens;

FIGS. 7A-7I show example displays of a sentence flashcard creation screens and picture selection screens;

FIG. 11 is an example of sample json object with information for a particular sentence; and FIGS. 12A and 12B are sample input screens that can be use used to create sentences for storage in the database.

DETAILED DESCRIPTION

Figure 1:
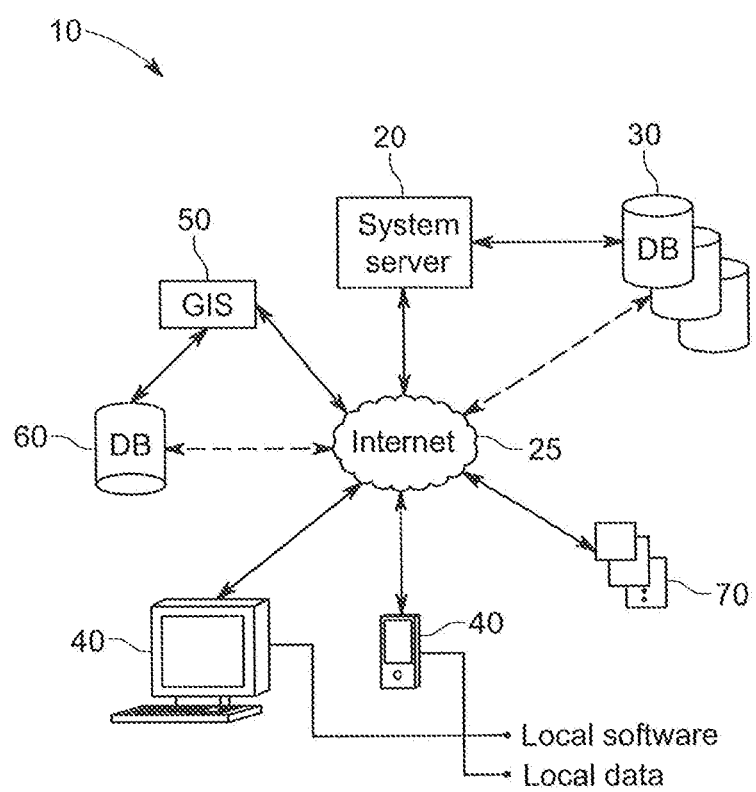
FIG. 1 is a high level diagram showing major system components of a language fluency system according to a particular embodiment.

FIG. 1 is a high level diagram showing major system components of a language fluency system 10. The system is preferably implemented using an app or webpage that allows a user to login an access their customized learning environment. An off-line version can also be provided. Users can log-in using a special account or via a third-party social media or other account, such as Facebook™.

The system comprises a primary server 20 which implements the back end software to provide an improved language fluency system. The software implements the main fluency system functions and can also implement ancillary functionality such as customer account creation and support. Server 20 is accessible over the Internet or other network 25 and can comprise one or more physical devices with a processor, program and data memory, storage, and other conventional elements. Server 20 has access to one or more databases 30. The databases can be local to the server, stored remotely and accessed over the network 25 or a combination of both. As discussed further below, the databases 30 store language instruction data including words, sentences, and corresponding audio and images, global and customer-specific data, and other information. Server operating software can be stored within conventional memory and can be distributed on computer readable media or made available for download.

User client computing devices 40, such as cell-phones, tablet computers, or PCs are also connected to the internet and can access server 20 and execute a software app for language training. The user software app is preferably a 'thin' client app which operates on a cell phone, tablet or other portable device. The app contains the functionality to step through the various user interface screens to allow a user to start a session, create or select cards to review, review the cards, and manage their settings. The server preferably acts as the primary repository for the all of the language and flashcard data for each user along with user account information and other metadata used in system operation. The user app will send queries and receive data responses from the server for the majority of user functions. This reduces the amount of storage required on the user's client device, avoids the need to synchronize user information if they move from one device to another, and allows server-side operations that considers flash-card data for multiple users.

The fluency system can alternatively be accessed via a web-page based login. Supporting apps, scripts, and other software can be downloaded and installed on the user devices 40. In an alternative arrangement, relevant user information can be downloaded and stored on the user device to permit off-line activities.

As addressed further below, a graphic image search provider 50 is also accessible to users 40. The GIS provider 50 can be a private server with its own proprietary images stored in an image database 60. Alternatively, the GIS provider 50 can be a publicly available search provider, such as Google™ or Yahoo™ that returns images from various websites 70 that meet entered search criterial. Identified images from the GIS provider can be stored remotely from the server 20 and user devices 40 and accessed by a database designation or URL on demand. Preferably, the server 20 stores only the image URLs for third-party provided images. This reduces data load at the server 20 and also allows the GIS provider to more accurately track access to images for licensing and other purposes.

Various features and functions of the fluency system 10 are addressed below.

The system operation is based on a flash-card deck model described in more detail below. Users have a number of options available from a Home Screen which presents recommendations on what to do next given input from the user on which languages they wish to learn and how much time they wish to spend on those languages every day. Study routines can be a combination of (a) creating new flashcards and (b) reviewing old flashcards. When there are additional reviews pending, the system can suggest a "bonus review session" to help clear out backlogs of review cards without making the user feel overwhelmed.

Several different types of flashcards can be supported. Not all of the different types need to be implemented in any given system. One primary card type is a word card or picture card, used in learning basic words. The card presents a word and a picture assigned to the word by the user in a manner addressed below. A second card type is a Sentence card which is generated to instruct in the meaning of a word and word placement rules in context of a sentence. Other card types can include pronunciation cards which are used to learn pronunciation with reference to pre-defined words, mnemonic cards, minimal pair/tone test cards to expose the user to minimal pairs of words that sound similar and can be easily confused, and pronunciation trainers. Word and phrase data with text and associated audio may already be stored at the system server 20 and databases 30 from which cards can be drawn.

Figure 2:
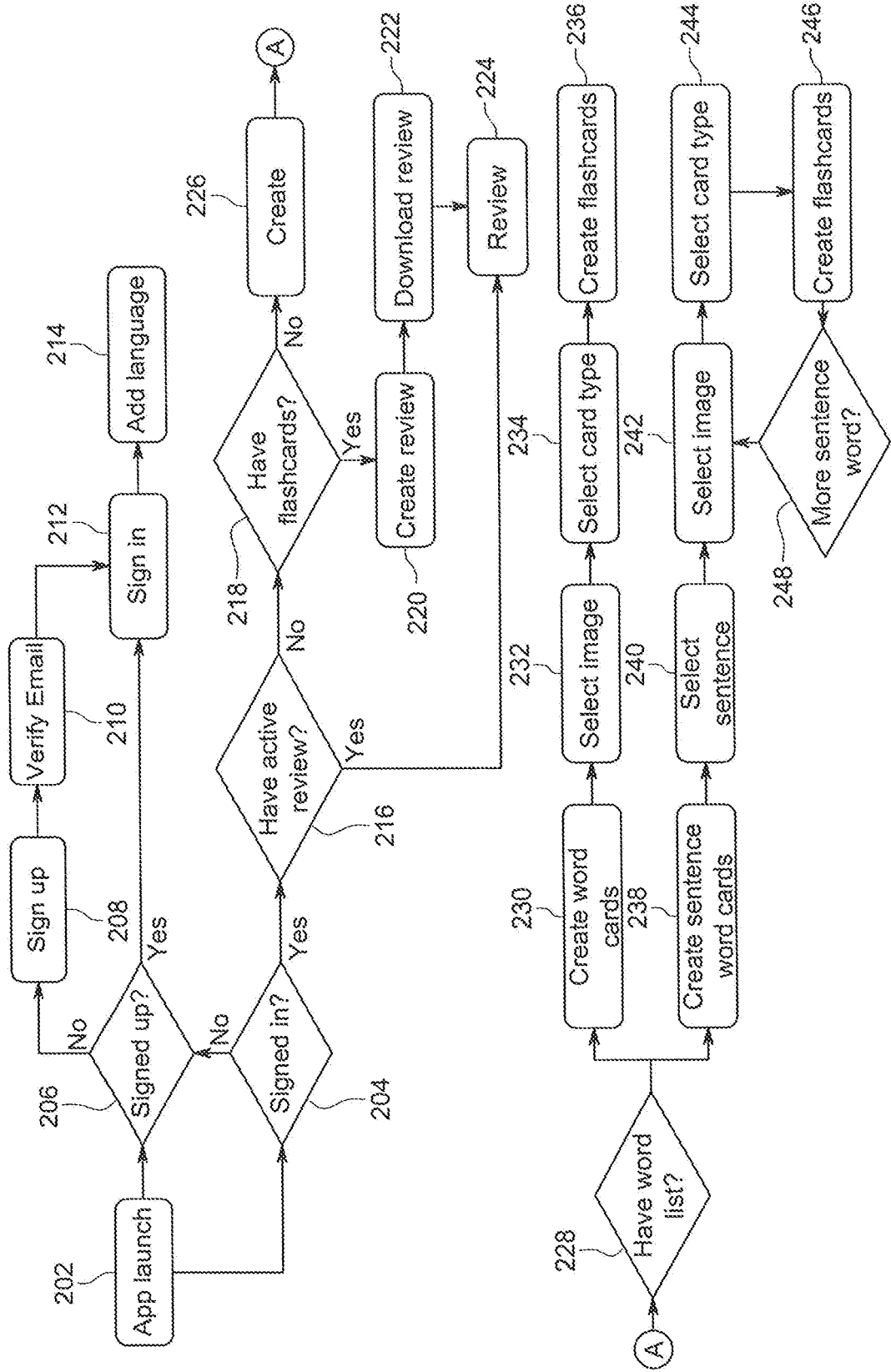
FIG. 2 is a simplified high level flow diagram of the basic sequence of operations presented to a user of an embodiment of the fluency system via an app.

FIG. 2 is a high level flow diagram of the basic sequence of operations presented to a user of an embodiment of fluency system via an app. After the app is launched (step 202), a user signs in or signs up for the service and selects a language to study (steps 204-214). Once signed in, if a flashcard review session is in progress (step 206) that review session will continue (step 224). If no review session is in progress, a check is made to determine if flashcards have been defined (step 218). If there are flashcards, a set of review session flashcards is requested from the server 20, downloaded to the user device 40, and then a review session is begun. (Steps 220-224). If no flashcards are available (or the user wants to create new flashcards) a flashcard creation process is initiated. (Step 226).

The card creation process starts with a list of words to learn. (Step 228). In one configuration, a predefined list of core words is provided and stored at the server database 30. A preferred set of 625 high frequency words that are easy to visualize and show up in many languages is disclosed in the *Fluent Forever* book. Other word sources, such as Dolch Sight Words or similar, can also be used. The words can be grouped into clusters, based upon thematic content (i.e., put in groups like "red-apple-delicious-fruit-lunch") instead of putting them into groups of similar words like "red-blue-green-yellow-orange", which can be more difficult to memorize. The words can also be linked to illustrations that show the connections between words as discussed further below.

While the client device 40 can be provided with the entire set of words and related data or a subset thereof. The word list can be sent by the server 20 upon a query from the client 40. In an embodiment the server 20 selects the particular words for a user based on their current progress and provides those words to the client.

Prior to building a deck of flashcards, the user can be presented the words in the list so they can identify those that they already know. These words can be removed from a list of words for which word cards need to be created. In a particular interface for each word, a user can indicate that they already know the word by tapping, swiping, clicking or other input on the word. If they do not know the word, the word can be skipped. While "known" words may still appear in flashcards, such as a sentence or other card, preferably, known words are displayed in a visually different form relative to yet-to-be-learned words. For example, words to learn can be shown in bold while known words can be unbolded.

During card creation, a user can also simply pick from a list of available words to create cards. The client presents words in a scrollable list, such as a set of tiles, and where one or more words can be selected by tapping the tiles for words the user wants to learn. Alternatively, or in addition, the server can select a set of words by default.

Figure 3D:
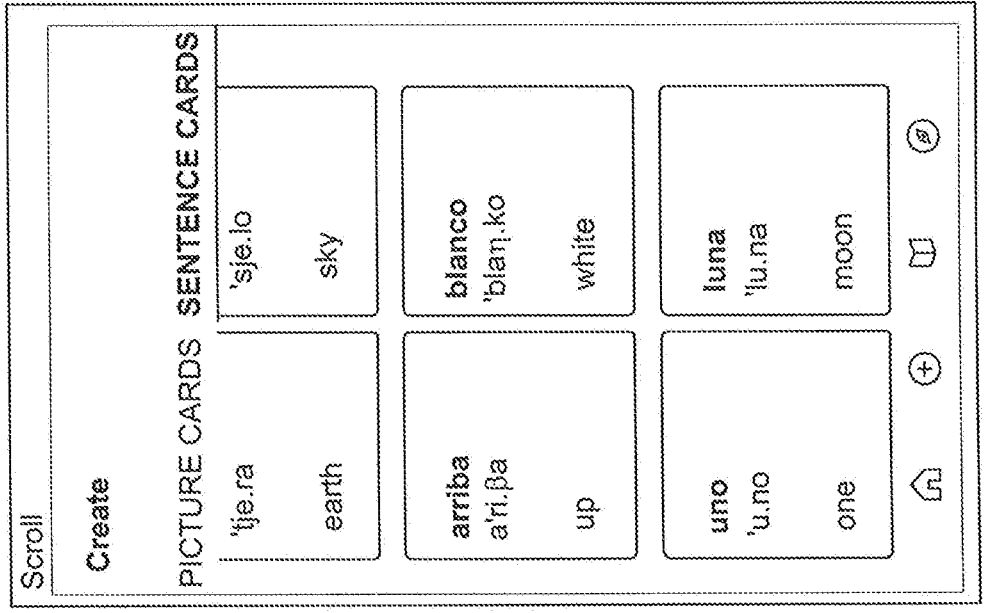
Figure 3C:
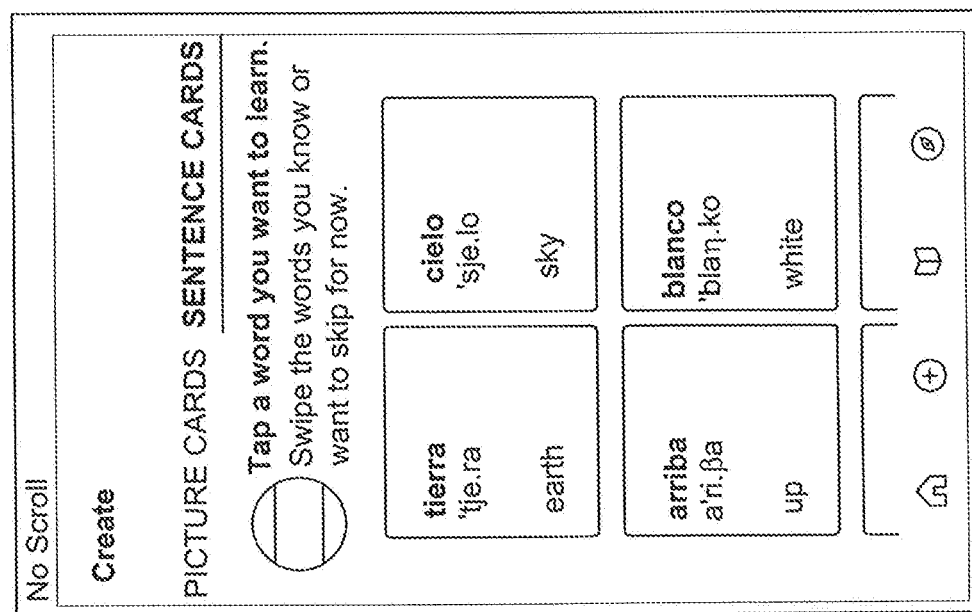

FIG. 3A is an example of a Picture card word selection screen 300 on a display of the client device 40. The screen presents words that are available for use in flashcards in scrollable set of selectable tiles or buttons 302 which show the foreign word and its translation. To select a word, the user can simply tap the word tile. FIGS. 3C and 3D show additional screens illustrating the scrolling word tiles.

Returning to FIG. 2, after a set of words is identified, a first step is creation of word cards (step 230) for one or more of the vocabulary words that need to be learned. As addressed further below, a user is prompted to select one or more images to associate with each of the words (step 232). These images will be shown on the flashcard for the word during review. If there are different versions of cards that are supported for a given vocabulary word, those can be selected (step 234). The flashcard(s) are then created (step 236). Flashcard creation can be done on a word-by-word basis after the user indicates whether they know or do not know a given word. Alternatively an initial review of all potential words for the deck can be done first and then the flashcards created afterwards.

Once users have completed their initial review of the system word list (such as the list of 625 core words), the system can generate a custom frequency list. The custom frequency list is based on a system generated global frequency list of words in the system's sentence database. The sentence database can contain initial content supplied by the system operators as well as content submitted by users. The global frequency list can be updated on a periodic or continual basis as users add their own sentences to the system database. The frequency list preferably reflects the frequency of dictionary forms of words, also referred to herein as a root form, wherein the usage of word variations all count towards the total of the dictionary for. For example, a usage of "went" and of "goes" will both be counted toward the total of the underlying dictionary form "go". The custom frequency list for a given user can be built by filtering the global frequency list to remove those words that the user has marked as known leaving words the user should learn. In addition, words that the user has already created flashcards for can also be removed from the custom frequency list. The frequency list can be used by server 20 in selecting sets of words for a given user to learn and an order for those words.

As individual words are learned or as otherwise appropriate or desired, a user can also create sentence cards (step 238). As discussed further below, starting from a particular word the user is presented with one or more sentences that contain that word or a variation of it. (Step 240). Preferably these sentences are provided to the client device 40 in response to a specific query to the server 20 seeking sentences for that user and particular word. Similar to word cards, a user selects one or more images to associate with the sentence cards (step 242). Different types of flashcard can be generated for a given sentence, including one to teach vocabulary, one addressing word order, and one that addresses the dictionary form of the word. A user selects which types of cards to create for the sentence (Step 244) and the flashcards are created (step 246). The user can then end or generate additional flashcards for other words in the sentence (step 248). Preferably, information about generated flashcards is stored in a database 30 accessed by the server 20. Relevant flashcard information is returned from the server 20 to the client when cards are to be reviewed.

According to an aspect of the invention, a particular user interaction process is provided to allow users to easily select word and sentence cards to create with minimal or no typing.

In one embodiment, when users are browsing through sentences to create flashcards, such as sentence cards, each individual word displayed is formatted to indicate whether or not that word has been previously tagged as being known by the user. For example, words to learn can be shown in bold while known words can be shown in plain text. Other format variations can also be used, such as color, italics, etc. In addition, if the word has multiple variations or tenses (such as "went" and "go"), each can be present in the word database (addressed below) but with links to the root dictionary form of the word. If one or more of the word variations or tenses is known, the system can mark the dictionary form of that word as "known" and the linked variations will also be treated as known. As an example, if a user learns the words "WENT" and "GO", the system can also mark 'GOES' and 'GOING' as known words and display them accordingly in future sentences. The words can be marked directly or linked to their dictionary form entry and that root marked and wherein when displaying known words the system will then check the associated dictionary form to determine if it is known. As will be appreciated, each user should have their own set of database objects reflecting their personal flashcards, known words, selected images, etc. Information for all users for a given language can be stored in a single database 30 at the server 20.

As noted, one aspect of the system is in helping users learn vocabulary by selecting one or more images that will be displayed with a flashcard. The selected image or images are linked to the word and/or flashcard and then displayed with the flashcard during card review. While there are various ways in which pictures can be selected, an improved methodology as disclosed herein is preferably used.

In flashcard creation, the client device presents a screen showing the word at issue and one or more pictures that a user can select for use on the flashcard for that word. FIG. 3B shows a particular picture selection screen 310 that shows the selected word and its translation 312 and an array of pictures 314 that can be selected by the user for that word.

According to an embodiment, when the client needs to display a pick-list of images that a user can select for a particular flashcard, the client 40 issues a query to the server 20 with information about the card for which the pictures are to relate to, such as the word or sentence that the flashcard is to be associated with. The client then returns a set of links, such as URLs, to the pictures that can then be retrieved by and displayed at the client.

Figure 4:
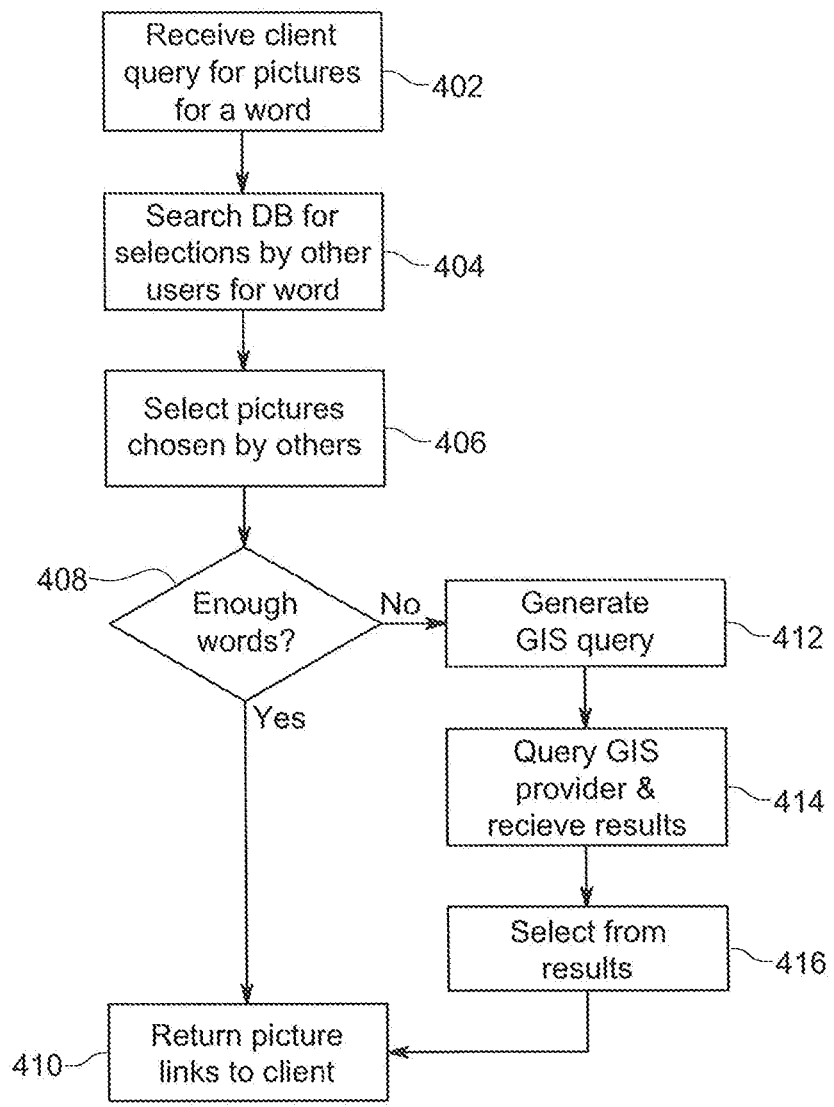
FIG. 4 is a high level flowchart of server operation in response to an image query from a client during a card creation operation.

FIG. 4 is a high level flowchart of server 20 operation in response to an image query from a client during a card creation operation. Upon receiving a client query (step 402), the server 20 system searches database 30 to determine if other users have already selected a picture for their own version of that word on a picture flashcard. (Step 404). If so, one or more of those previously selected pictures are chosen up to the total number of pictures to be returned to the client. Preferably, pictures are selected in order of popularity. In addition, the program can monitor which images are chosen only infrequently or not at all by other users and stop offering those images for selection in favor of images that are chosen or otherwise filter out results where there have not been enough user selections to be meaningful. If enough pre-chosen pictures are available (Step 408), the results are returned to the client. (Step 410).

If there are not enough pictures, the server 20 will automatically generate a GIS query (step 412), and then query the GIS provider and receive the results. (Step 414). The additional number of pictures needed is then selected from the returned search results (step 416) and the set of pictures selected by other users (if any) along with the GIS results are returned to the client. (Step 410). Over time, enough image selections will be made by users so that most or all presented images will be based on popularity. This can significantly reduce the number of automated GIS requests issued by the system. (As noted elsewhere, preferably only links to the images are returned to the client, as opposed to the images themselves.)

As discussed further below, preferably vocabulary words are stored in the database system with a tag or link to or other indication of the dictionary form of the word. When the server 20 initiates a GIS query for given vocabulary word, the search query preferably uses the dictionary form of the word instead of the vocabulary word itself (unless, of course, the word is the dictionary form). For example, where the vocabulary word is "went", the system can issue a GIS query for the word "go" instead. Advantageously, use of the root word instead of the actual word shown on the card produces better search results overall. As noted below, each vocabulary word stored in a database can be linked to or otherwise be part of a data record indicating the root word.

In some instances, particularly in the context of vocabulary words within a sentence (discussed in more detail below), a vocabulary word can be tagged as abstract. This indicates in the context of the present invention that the word is of a type deemed unlikely to produce useful GIS results for the word or its dictionary form. For those words, the system selects alternative search parameters. If the vocabulary word has been selected from part of a sentence flashcard, the alternative search parameters can be generated using the using one or more other words in the sentence that are not tagged as abstract and preferably the dictionary form of those words. The word or words can be selected at random or based on other factors such as the type of speech or frequency of use. In a sample sentence "The dog chases a cat", the words "The" and "a" are tagged as abstract and the word "chases" is linked to the dictionary form "chase." If the card is being defined to help the user learn the meaning of the word "a" and a selection of images is to be presented, instead of searching for "a", the system can automatically generate a search query with one or more of the words "dog" "chase" and/or "cat" to search for relevant images for the abstract word "a" in the context of this sentence. As with non-abstract words, the system can also present popular images that have been selected by other users for the same abstract word in that sentence.

The server 20 can indicate whether the pictures returned are popular pictures, pictures from a search, or a mix. The client app can indicate this on the display to provide the user with some additional insight into where the pictures they are shown came from.

Figure 5:
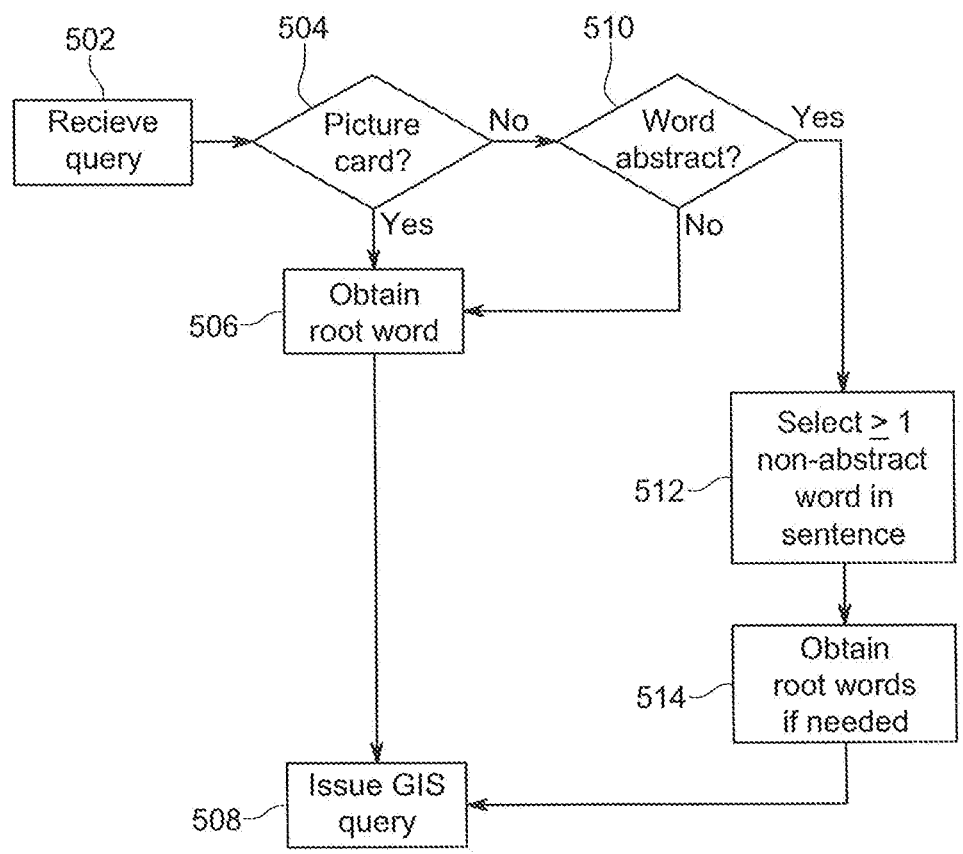
FIG. 5 is a simplified high level flowchart showing operation of the server in response to an image query from the client.

FIG. 5 is a simplified flowchart showing the operation of the server 20 in response to an image query from the client as discussed above and where images are selected for picture cards or sentence cards. When the server 20 receives an image query from a given client in connection with a flashcard (step 520), the type of flashcard is determined. (Step 504). If it is a picture card (e.g., a card to teach a single word), the root of the word is obtained, if needed (step 506) and used to issue the GIS query (step 508). If not, the card is a sentence card. If the word in the sentence is not abstract (step 510), the system proceeds in the same manner as a picture card. If the word is abstract, the server selects one or more non-abstract words from the sentence for the card. (step 512). Root words for the selected words are obtained, if needed (step 514) and the selected root word are used as the GIS query.

The image selection process provides an improved set of images that a user can choose to associate with a given flashcard. In addition, by using previously selected pictures where possible, the methodology also reduces the number of GIS search requests that the server needs to issue, thereby improving overall system efficiency. A further benefit is reduced operating costs since many GIS searches are fee based and fees are dependent on the overall number of searches requested.

Returning to FIG. 3B, if the user does not think any of the presented pictures are appropriate they can initiate a further search by pressing, e.g., a designated advanced search button 316 in the image array. The search query provided by the user is preferably passed to the Server 20 which then issues it to the GIS provider 50 and returns at least a portion of the search results to the client 40. Restricting queries to the GIS provider 50 to come from a common source (server 20) allows for better management and tracking of resource usages associated with the system 10. The server 20 can track user-generated searches to determine improved automatic search query generation. For example, if the search is for a card to teach an abstract word, the words selected by the user for an advanced search can be used in the future to adjust the algorithm used by the server 20 to select automatic searches for that same word/card in the future. The server can also filter or block searches, for example to exclude obscene terms. Alternatively, client 40 can be configured to issue the search directly to the GIS provider. Advanced search is address in more detail in connection with sentence flashcards.

In some case, a user will not want to use a proposed image or a search result. The system can be further configured to allow users to upload their own personal images. An add image button 318 or other input can be used to select this option. The user will then be prompted to locate and select the image file they want to use. Preferably, personal images can be uploaded and stored at the server or other designated network location so that the picture will be available to that user if they log in using other devices. The upload image can also be assigned a unique network or other address to be used when referencing the image, e.g., as part of a flashcard record, so as to allow the user's device to retrieve the picture in the future. Personal images can also be tagged to prevent them from being considered as an image option that is presented to other users.

Although copies of actual images can be stored either by a server or on a local device, preferably images are represented by links to a networked image storage system and only the links, such as URLs, are stored. When images are to be displayed on a user's client device, the image is fetched at that time from the network. The client can cache the image in local storage for use in the future. The image storage system can be centralized, such as a dedicated image storage database 60 associated with a GIS search provider 50. Or it can be a more decentralized cloud storage system. If the GIS search provider is a publicly available internet search provider, the image links may be URLs that point to various web pages 70. If a networked image to be displayed is not available or an access request times out, an alternative image can be selected automatically to display in its place.

When defining a flashcard, a user can also be given the option to add additional mnemonic information to a card to assist them in learning. Such information will be stored along with the flashcards and presented during training sessions. For example, a user can specify personal connections they have to a word, any notes they wish to include, or any other mnemonics they wish to include.

Some mnemonic information can be specified for linked to different classes or types of words, such as words of different genders. Standard attributes, such as gender, part of speech, etc. can be indicated by tags within the system's word library for various words. A user can also be allowed to define additional word types to be stored locally. A user can then have the option to specify a flashcard attribute to associate with various word tags. When the card is displayed, if such mnemonic features are enabled, the software checks the word tag and displays the selected attribute for the flashcard. For example, a user can select different colors to be associated with word gender and part of speech, such as specifying that feminine nouns be given a red border. When the feature is enabled, it is applicable to all words in the database of that type.

Other flashcard attributes can also be defined. Users can have the option to add an icon image which will automatically be added to all flashcards for words with the particular tag. Icons can be selected by searching a predefined icon database. Icons can also be imported by the user. As an example, a user can search for "fire" icons, and select one that will be applied to all feminine words in the database. Icons can be static or animated. Other flashcard features can also be varied, such as the size and shape of the card, its border, apparent texture, or even an animation of the card itself (melting, waving, shimmering, etc.).

According to a further aspect of the mnemonic feature, when such concept mnemonics are defined, the system will automatically create a new pairs of flashcards to specifically train the user to remember the connection between the chosen icon or display attribute and the associated chosen abstract concept type (e.g., a card would be defined to link "'fire' icon" and "feminine" word). These automatically generated cards will be added to the user's card deck and can be treated in a similar manner as vocabulary cards.

In addition to helping students learn languages with grammatical gender or other abstract, challenging to remember concepts that are linked to individual words, the system can also vary other output features according to word tags, such play different recordings for different types of words or apply audio effects to existing recordings. For instance, students can choose a female voice to read all Feminine Gender words in Spanish, or they can apply a 'robot' audio filter to all "Neuter Gender" words in German. Other sound effects may also be provided and can be selectable by users to add to flashcards as an additional memory tool to help them recall certain words/phrases.

Figure 6:
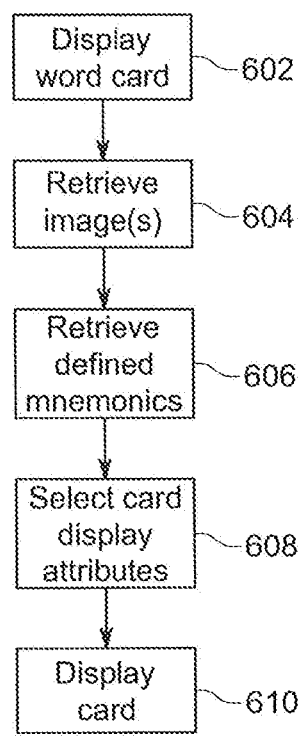
FIG. 6 is a simplified high level flow chart of aspects of a word flashcard display operation on the client side.

A high level flow of certain elements of a word card display operation on the client side is shown in FIG. 6. When the client is to shows a card, such as during a flashcard review session, a display word card request is issued. (Step 602). The client retrieves the image(s) linked to that flashcard (step 604) from the network (or possibly a local cache if the same image was recently loaded). The client also accesses the defined mnemonics, if any, for the card or for card categories as indicated by any tags defined for the word. (Step 606). The appropriate card display attributes are selected for defined mnemonics, such as border color, etc. (step 608) and the card is then displayed (step 610). As will be appreciated, additional client functionality will allow a user to flip from one side of the card to the other, to enter whether their selection was correct or not, to playback audio that may be associated with the card, and to implement other elements of a flashcard review process.

In addition to selecting and defining flashcards for individual words, the system provides an improved methodology, user interface, and system architecture to allow creation of sentence flashcards without requiring the user to type anything. With reference to FIGS. 7A-7F, when a user wants to learn a word in the context of a sentence, they are presented with a screen 702 that has a menu of words 704 that are available. Some or all of vocabulary words available to the user can be presented, where the words selected to present are chosen by the system according to an algorithm. Similar to the menu from which words can be selected for individual word card as shown in FIGS. 3C and 3D, the user may scroll through various words. The user selects a word from the list, such as by tapping it. Alternatively, the system can automatically chose a word that the user should practice and then present sentences for that word. Preferably, in this screen and others where word lists are presented for selection, the user can also use a different selection input, such as swiping left or right, to indicate that the word is already known or to tell the system to skip the word.

Figure 7C:
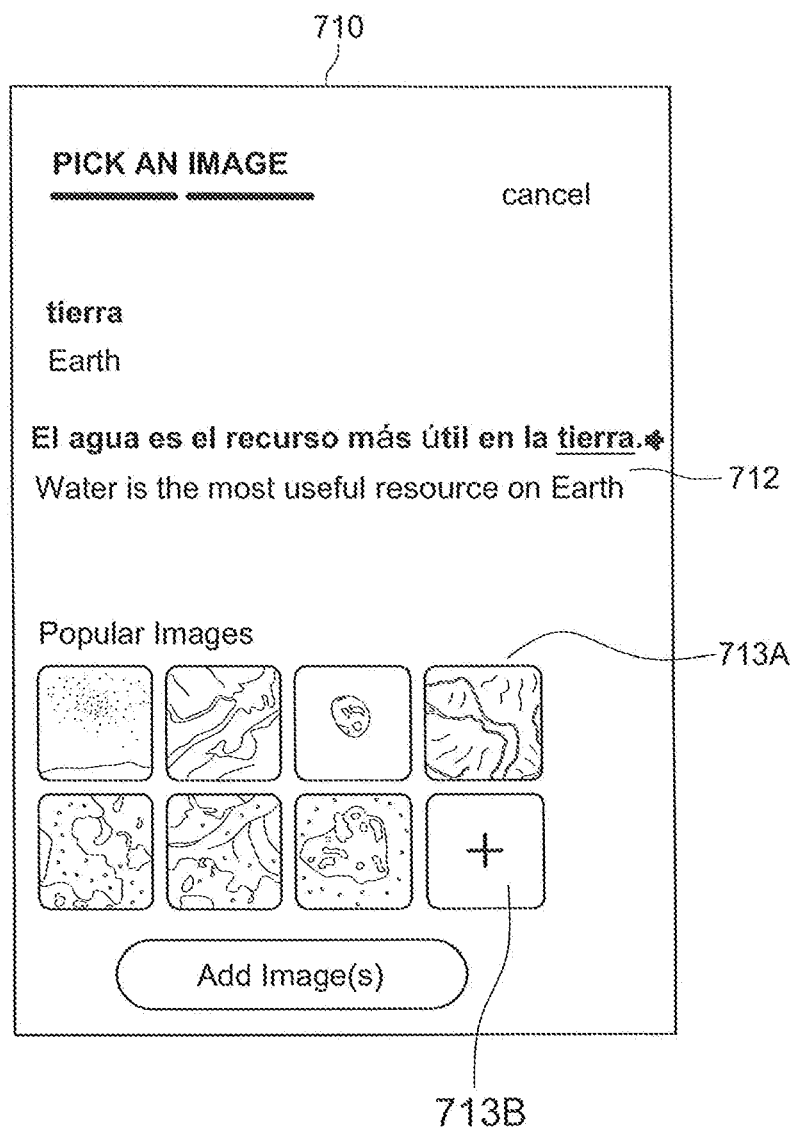
Figure 7E:
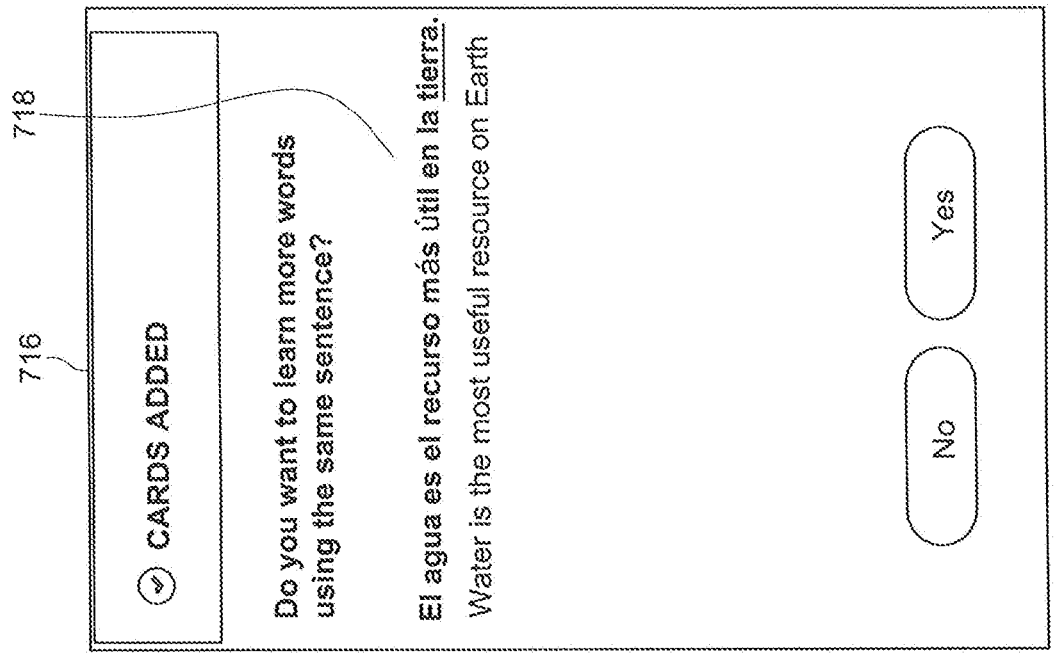
Figure 7D:
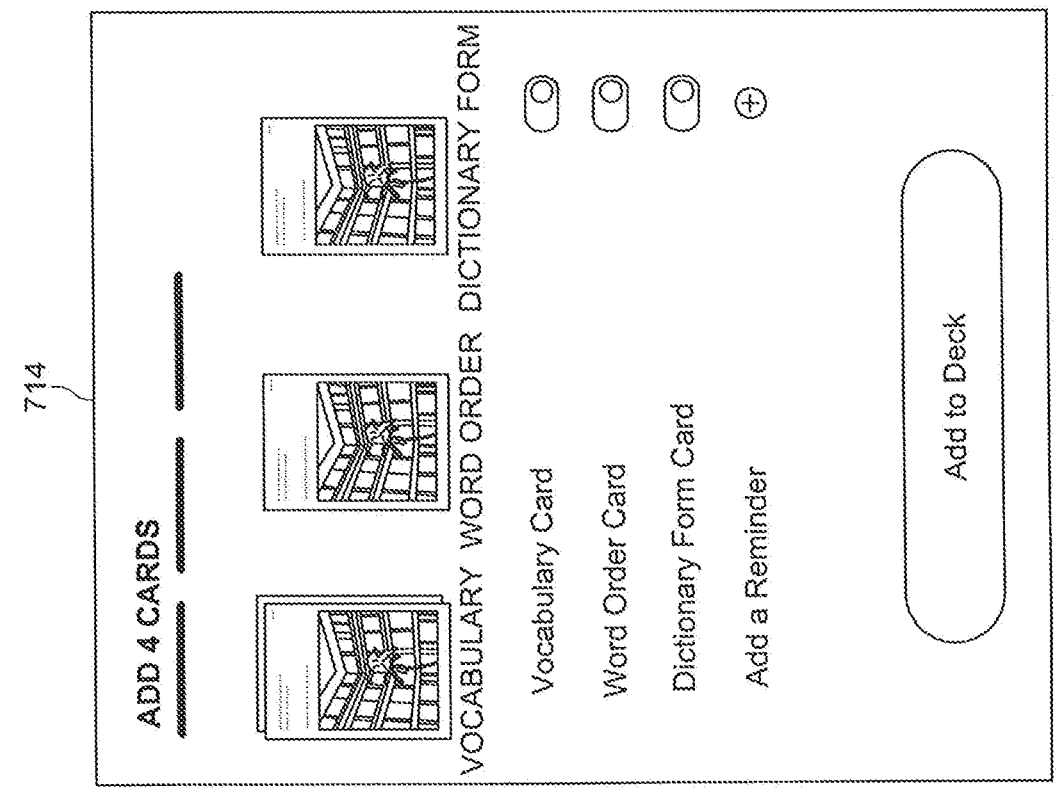
Figure 7F:
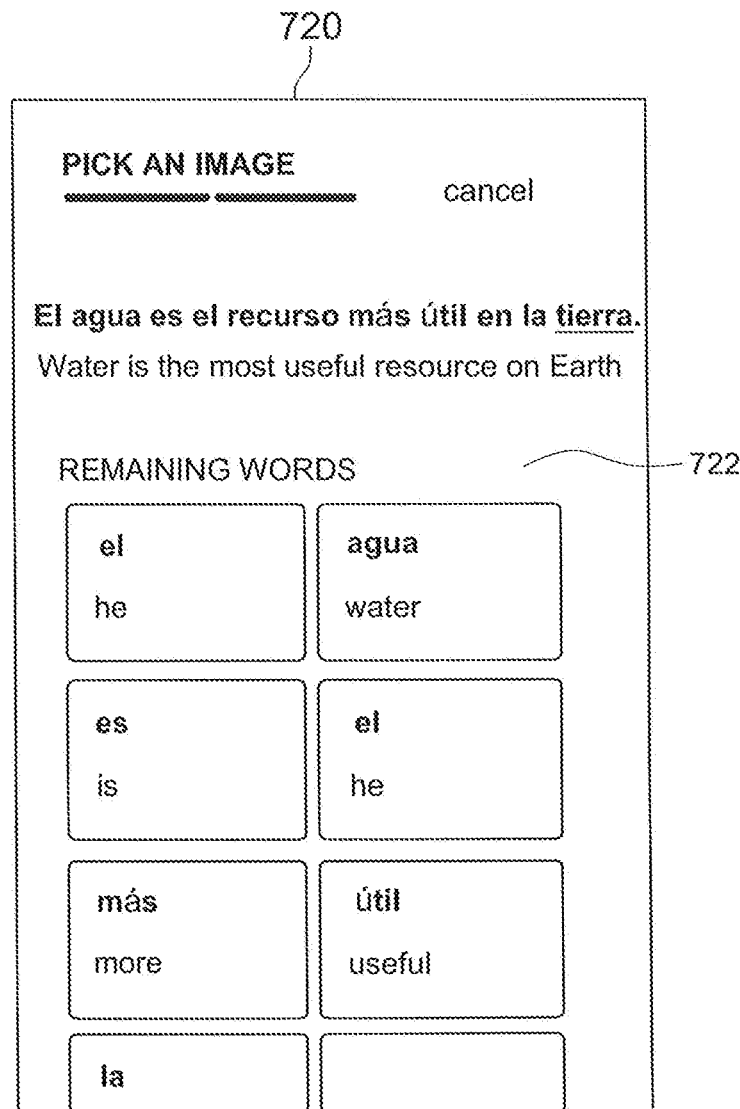

After a word has been selected, the system searches the database to identify predefined sentences that use the selected word. Preferably, the client device 40 issues a query to the server 20 which then returns one or more sentences that have been defined for the selected word. A screen 706 showing the sentences with the selected word 708 is displayed along with the sentence translation. In the embodiment of FIG. 7A-7C the selected word is highlighted, such as by underlining it, to identify it to the user.

One or more sentences can be defined for each word. For example, the system can be configured with 625 predefined vocabulary words and three predefined sentences can be associated with each word, such as an easy, medium, and hard sentence. The user selects the sentence they want to learn and the system then displays an image selection screen 710 for the word in the selected sentence. The screen can show the selected sentence 712 as well as a sequence of images 713*a*. Image selection operates in a similar manner as for word cards discussed above wherein a series of selected images are presented and the user can select one to use.

Figure 7G:
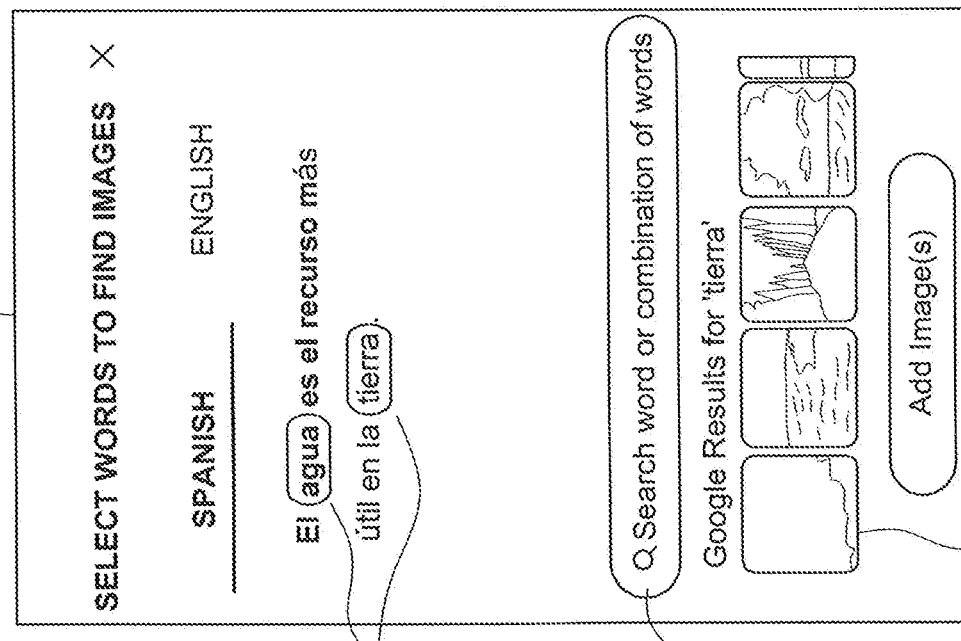

If the user does not like any of the recommended images, the user can select an advanced search option, such as by pressing an advanced search option button or area 713*b*. In an advanced search, the user is able to build a new search query which can be used to identify other potential images. In a preferred implementation, and with reference to FIG. 7G-7I, the user can generate a search query by tapping on one or more of the words in the displayed sentence for the card being generated. Tapping a word in the sentence automatically adds it to the search query. Tapping additional words adds those words as well. Tapping a word in the query or that word in the sentence can remove the word from the query. Preferably, words can be selected from either the target language sentence or the accompanying translation of the sentence displayed in the user's native language. Both language sentences can be displayed or the user can toggle between the two. Searching with different language terms can return different results. In one embodiment, words can be selected from either sentences. In an alternative embodiment, the tap-built search can be restricted to words only from the native language or the target language sentence and wherein when the user selects a word from a sentence in the second language, previously selected words in the first language are removed from the query. Screen 730 in FIG. 7G shows a screen in which two words 732 in the sentence have been tapped and those words used in a GIS query sent to the server 20. The images identified in the search returned from the server 20 are also shown in a selection area 734.

Advantageously, this process allows for an improved search query generation that can be quickly practiced, is well suited for implementation on hand-held devices such as cell phones and tablets, and does not require a user to manually type in search terms.

Figure 7H:
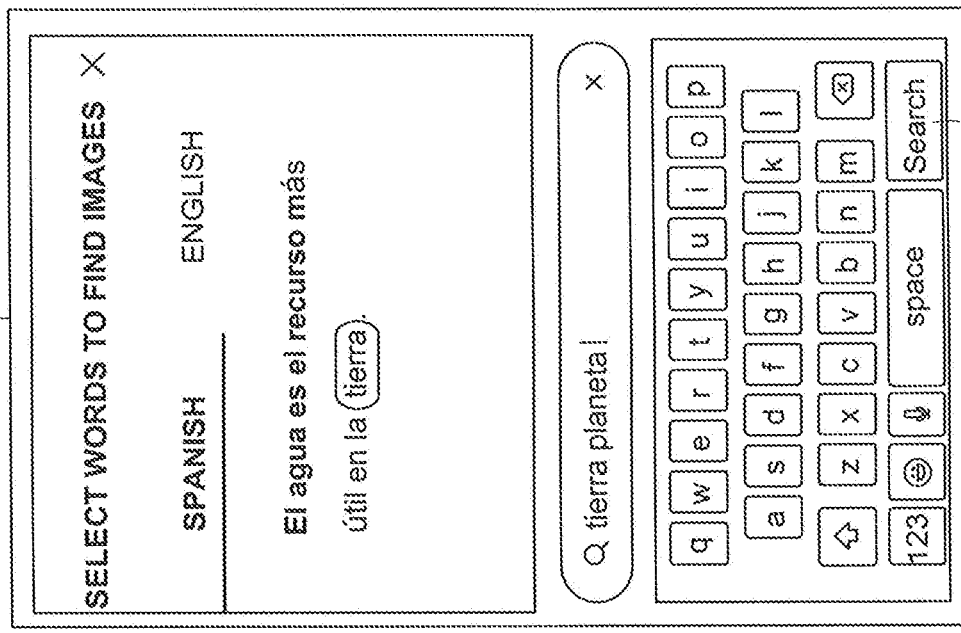
Figure 7I:
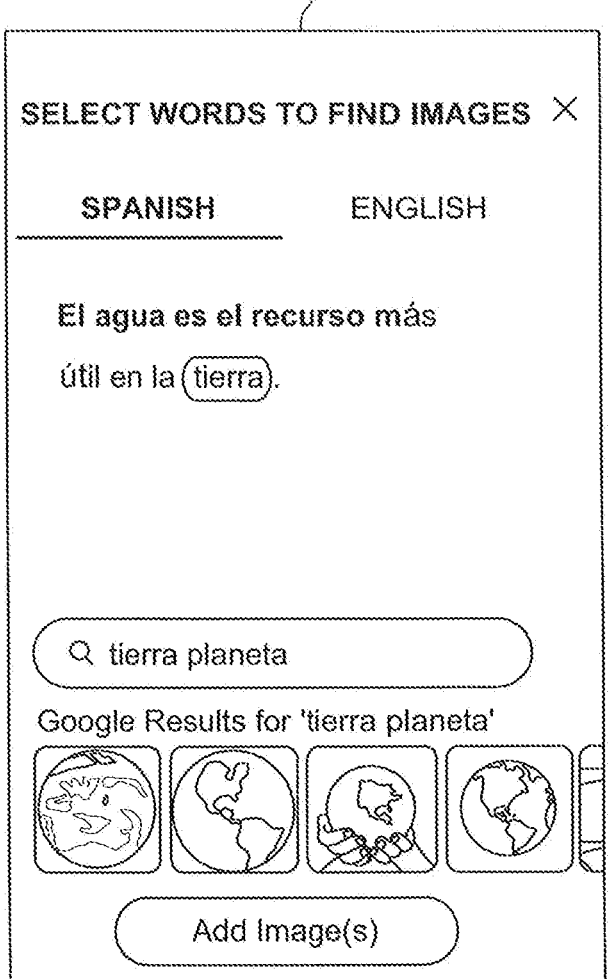

In one embodiment, searches are restricted one or more words in the displayed sentences. In an alternative, the user can also manually enter search terms or edit a query being built by manually entering text into the query field before submitting it. This can be activated by touching a query search field 736 as shown in screen 730. Screen 740 in FIG. 7H shows a manual search entry screen. The search query for words already selected can be shown and the user can edit the query, e.g., to add additional search terms. When the user is done editing the query a search can be initiated, such as by pressing a search button 742. The query is then sent to the server 20 and the identified pictures returned and displayed for selection, such as shown on screen 750.

If none of the images recommended or found in a search are desired, the user can upload an image as discussed with respect to word flashcards.

After one or more images are selected, the user can be prompted to identify which types of sentence flashcards they would like to generate, as shown in screen 714, if the option is available. The flashcards are then generated. Various types of sentence cards can be available including: (1) a fill in the blank sentence with a picture; (2) a flashcard with the isolated word on it; (3) a flashcard with the dictionary form on it (if the word is not already dictionary form); and (4) a fill in the blank sentence, asking for a dictionary form. Preferably all of the generated cards have the same set of associated images.

As shown in Screens 716 (FIG. 7E) and 720 (FIG. 7F), the user can continue to generate additional cards for other words in the sentence. The sentence is shown again with the word in different formats so that the word(s) cards have already been made for and the words remaining can be easily identified, such as by using plan and bold text. In screen 716, the previously selected word "tierra" (718) is in plain text and the remaining sentence words are bold. If the user wants to continue, a pick list 722 of the remaining words in the sentence is presented. If the user selects an additional word, the image selection and card creation repeats. The user can continue until they are done or cards have been created for all words in the sentence.

Alternative options are also available for sentence selections. The user can have the system search for predefined sentences that happen to contain their word (even if the sentence was not specifically generated to help teach that word). Or the user can opt to select from sentences within a central community database of user-defined sentences that contain the target word. Predefined sentences should include information about the root/dictionary form for every word within them. Recordings of the sentence and words being spoken can also be provided. Community sentences can be presented with additional information showing how many other users are also using this sentence, along with information about whether or not there is a recording available. Sentences can also have a discussion forum attached to them, where users can ask questions about grammar and staff native speakers can provide answers. Alternatively, other users can supply answers and native speakers made available by the system provider can moderate, by making small edits when needed and selecting certain answers as 'correct' or 'best answers'. Entry of new sentences is discussed further below.

After sentence flashcards have been defined, the user can move to various review screens to study the flashcards that have been added to their flashcard decks. The process for presenting sentence cards for review on the client device 40 is similar to that for word cards (and indeed, a word card could be treated in some implementations as a sentence card with a single word sentence). According to particular aspect of the invention, sentences are stored and displayed on a word-by-word basis. Optionally, each word shown in a sentence can be formatted independently of the others based on meta-data such as whether the word is known. Alternatively, sentence words can be independently formatted during creation of sentence flashcards but displayed in a common format when the flashcard is later displayed in a review session.

Figure 8:
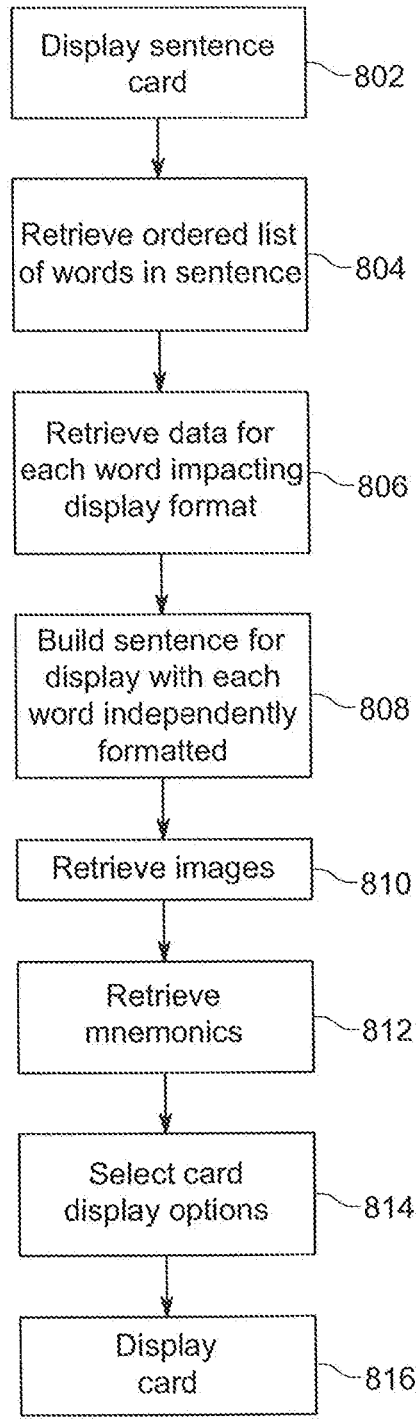
FIG. 8 is a simplified high level flow of certain elements of a sentence flashcard display operation on the client side.
Figure 9A:
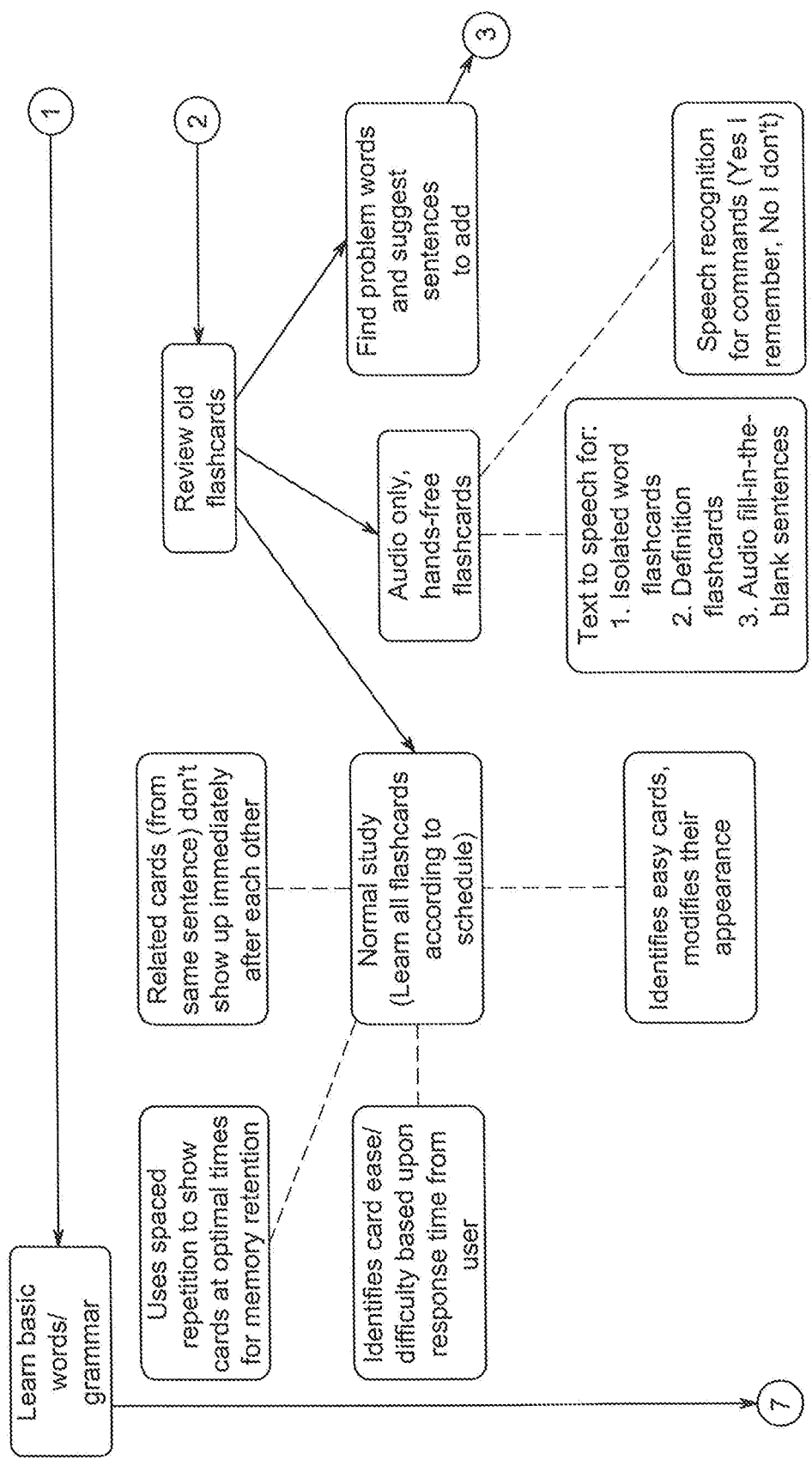
FIGS. 9A-9F show a high-level summary flow diagram for a particular implementation of the system that illustrates various features and functions that can be implemented in one embodiment.
Figure 9B:
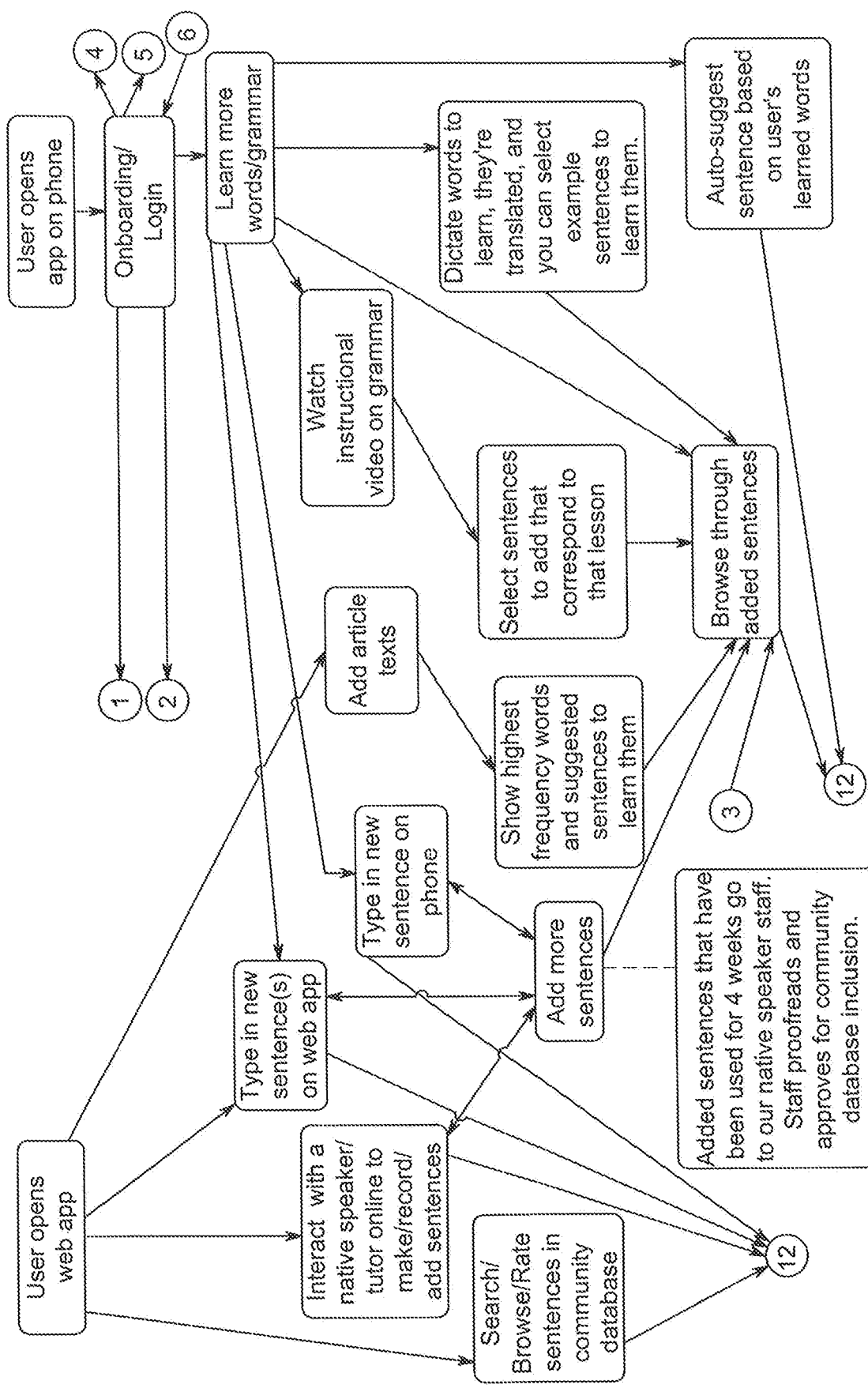
Figure 9C:
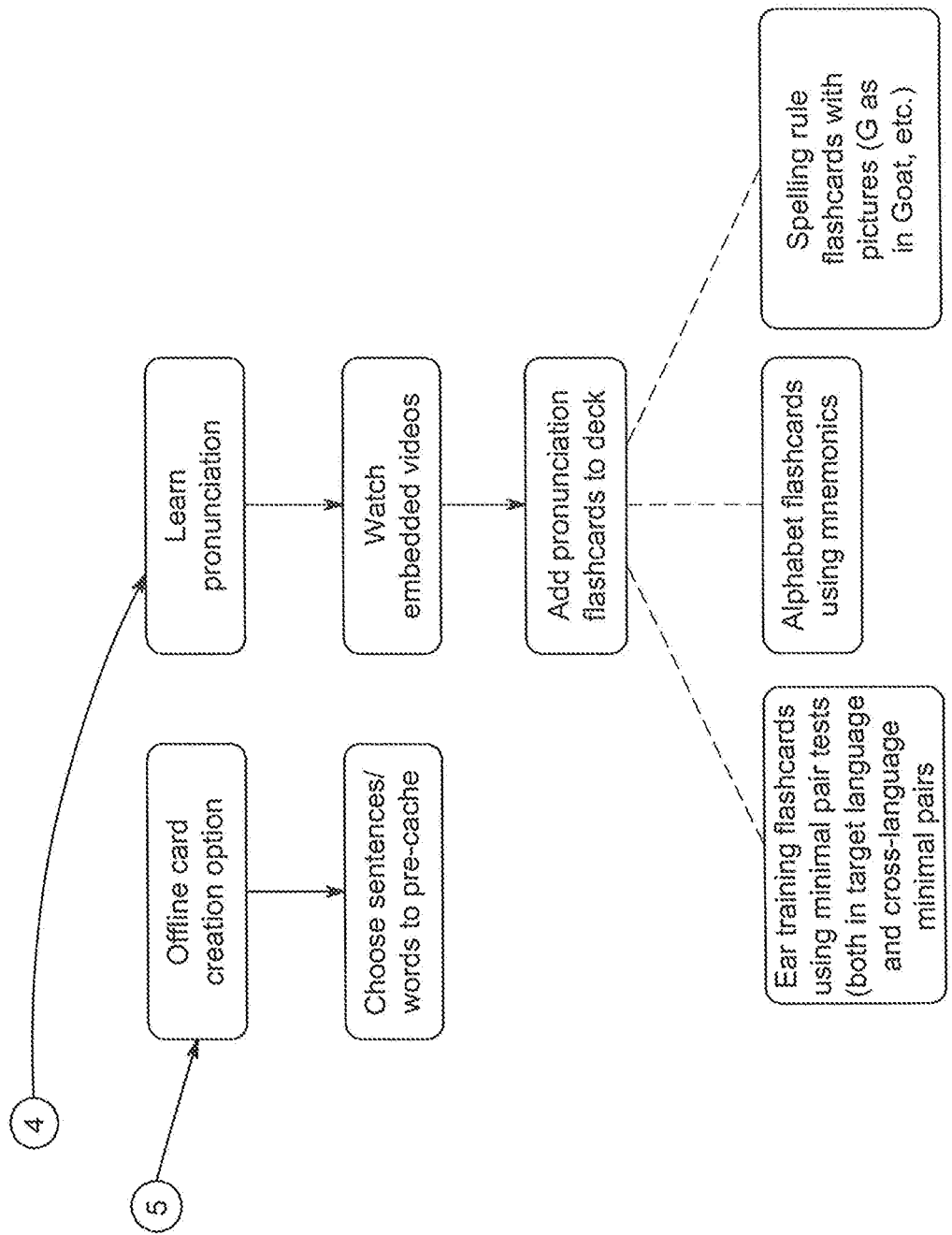
Figure 9D:
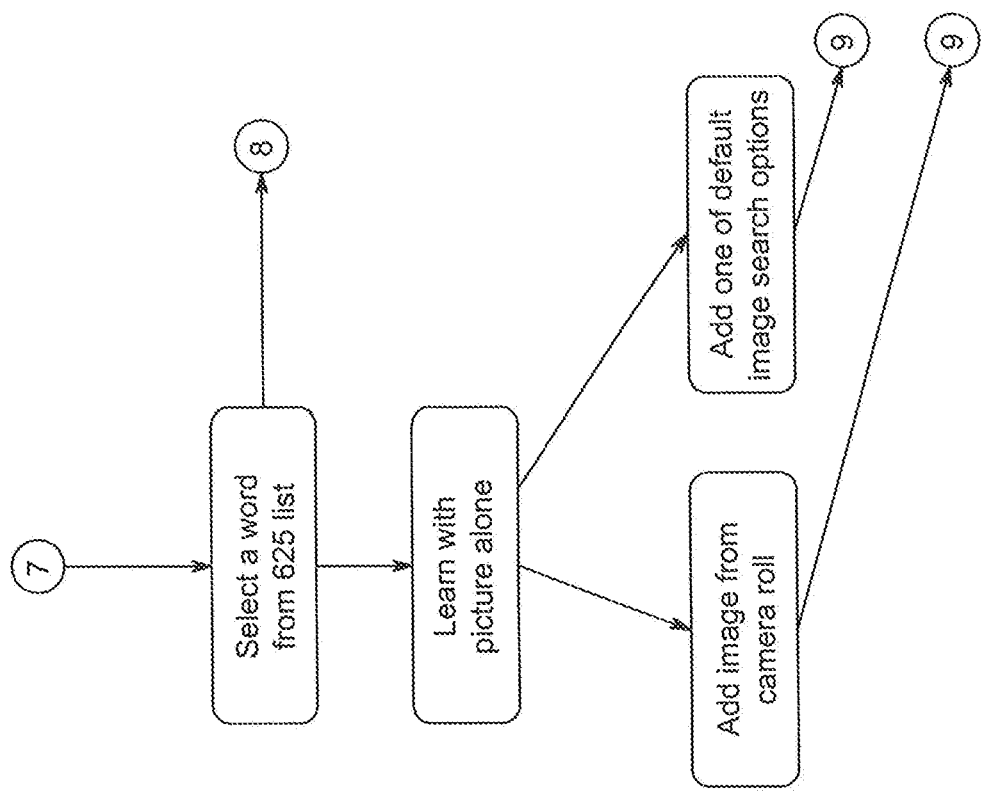
Figure 9E:
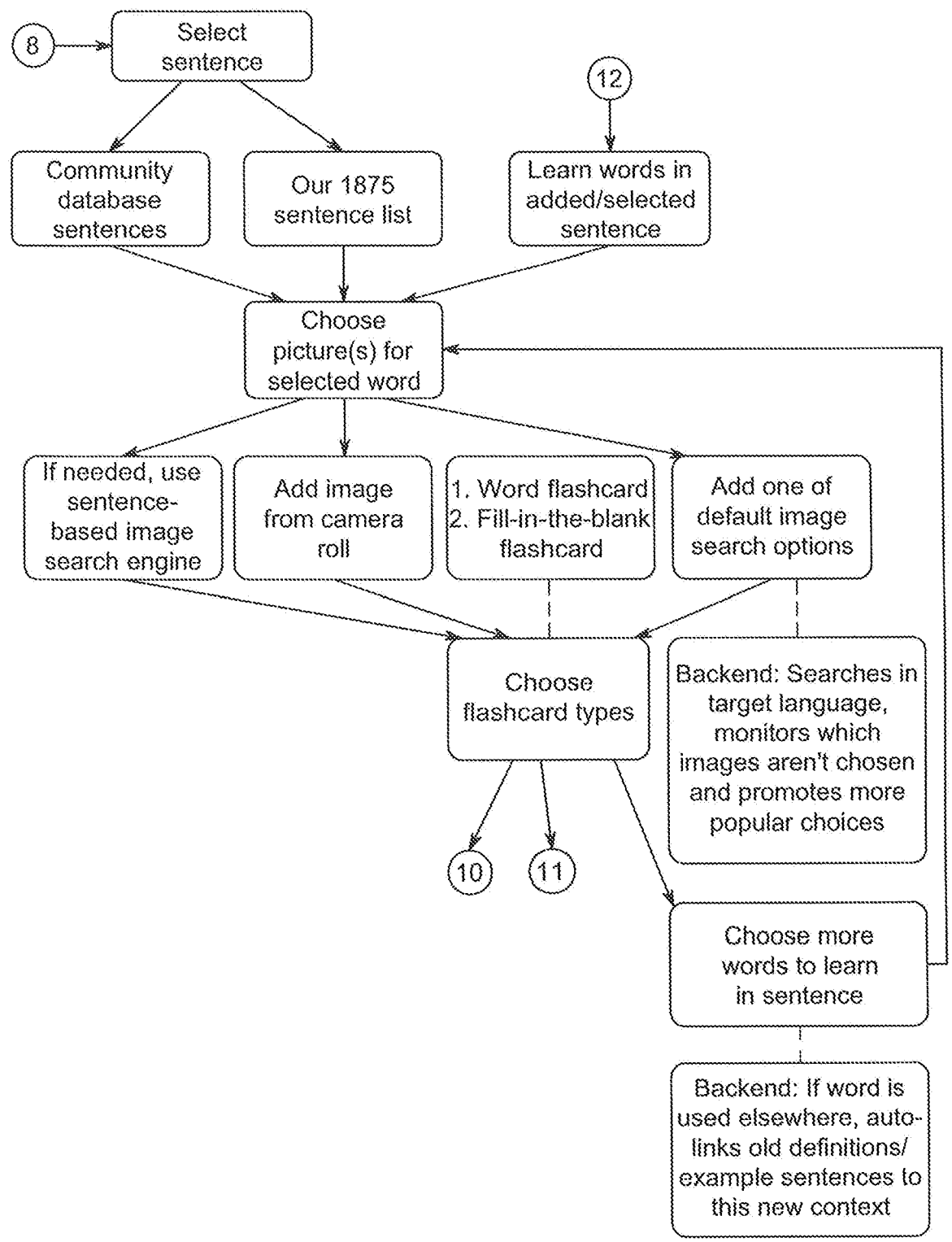
Figure 9F:
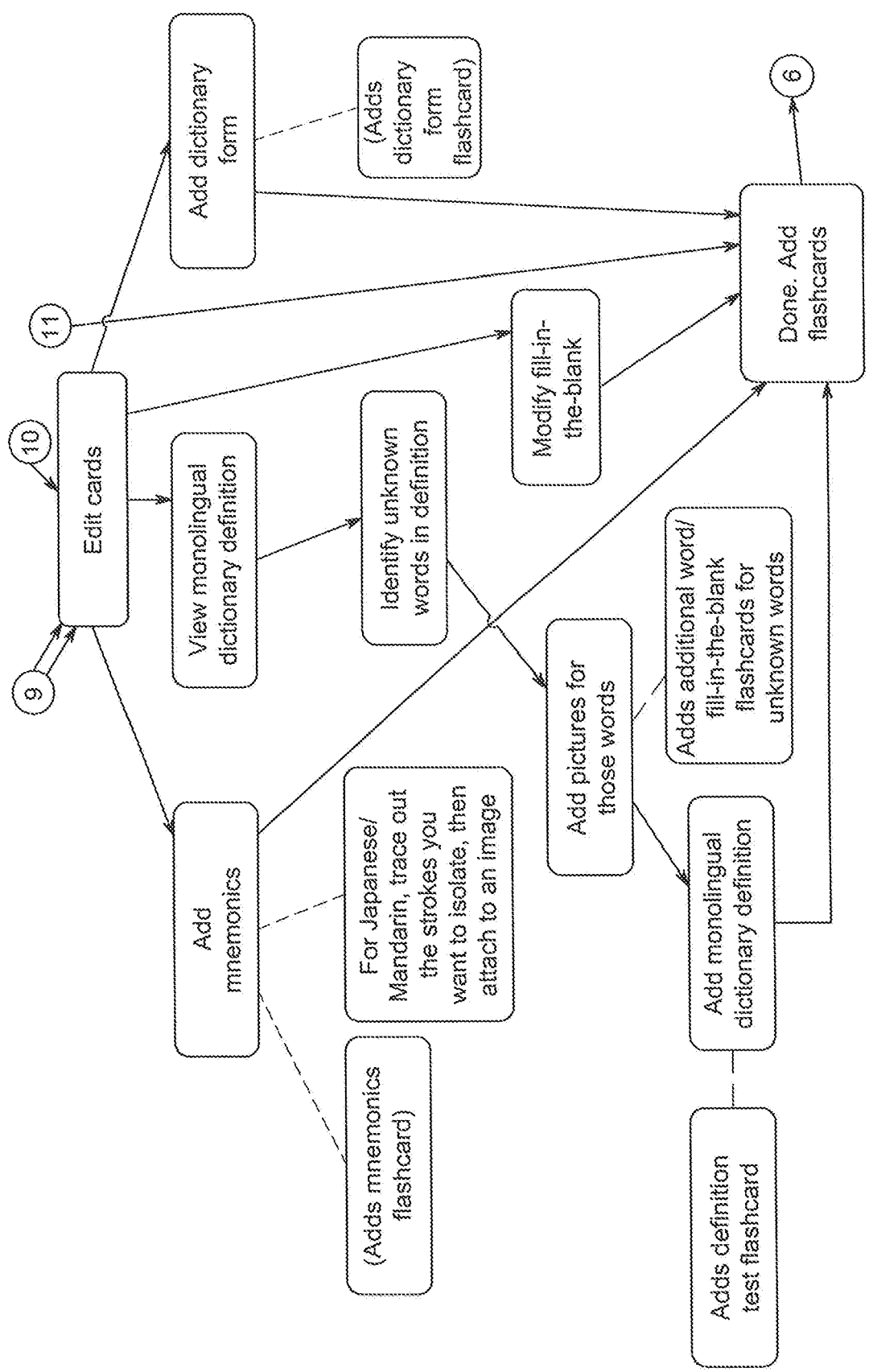
Figure 10A:
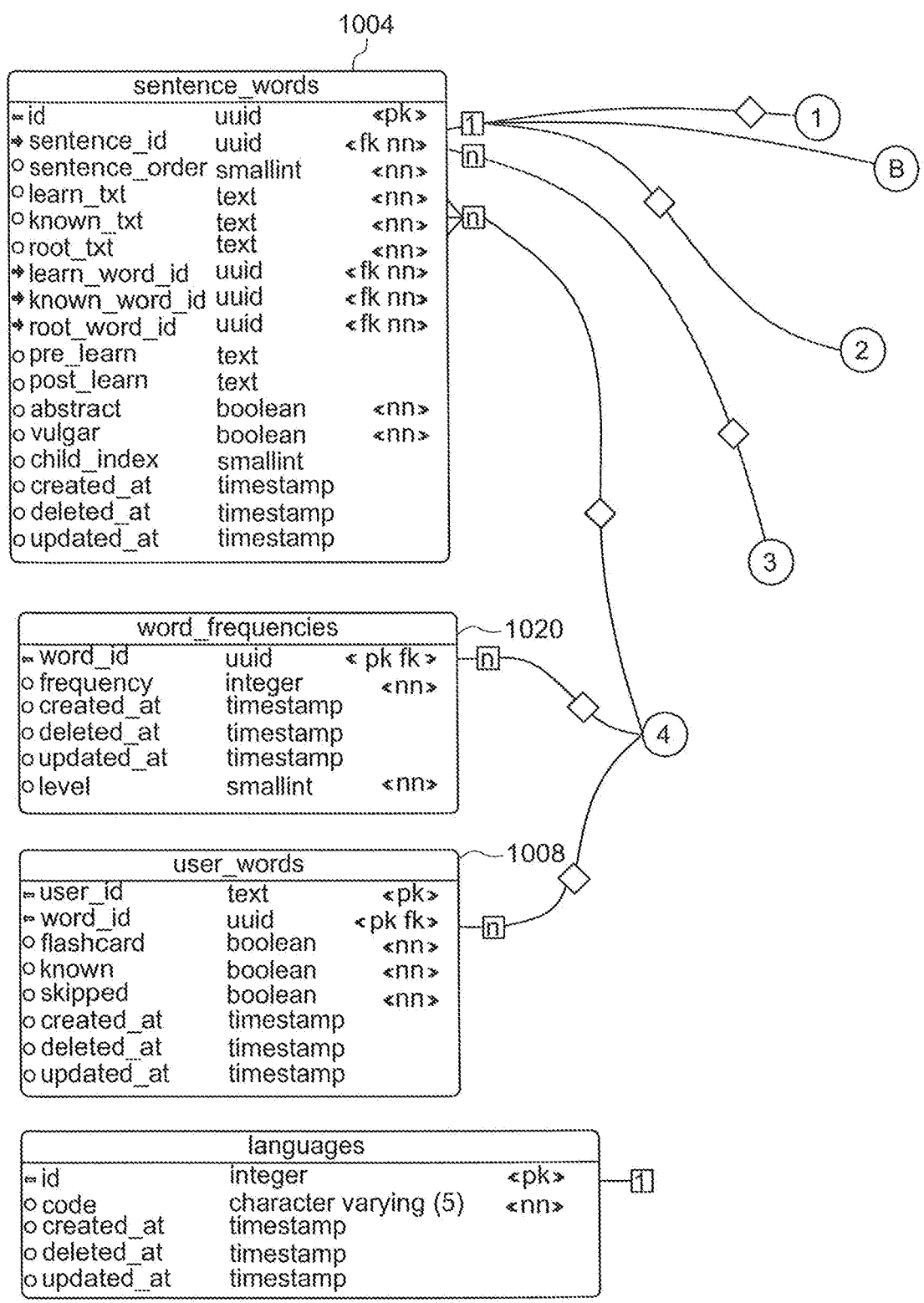
FIGS. 10A-10E show an improved database schema for use in a particular embodiment.
Figure 10B:
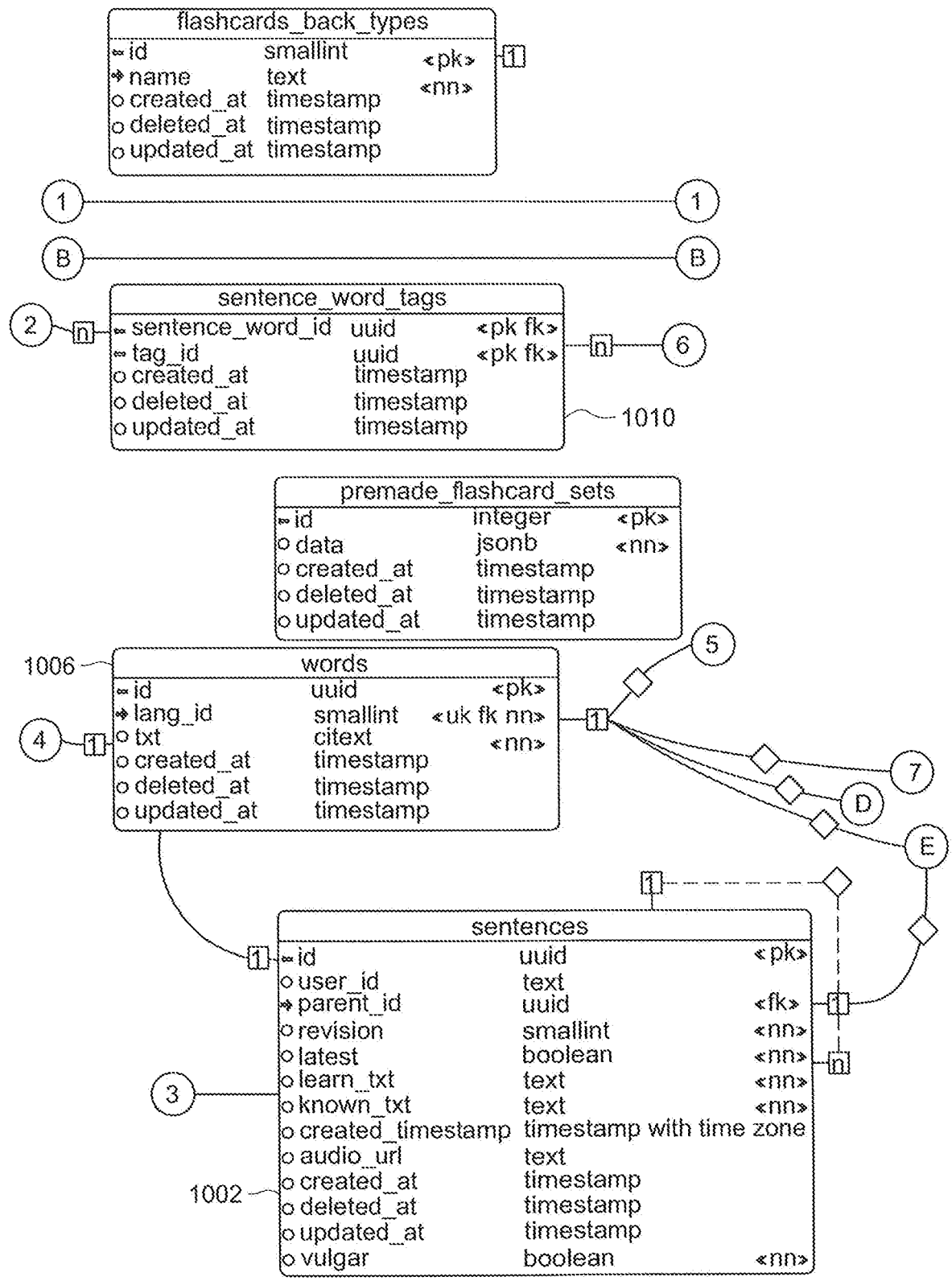
Figure 10C:
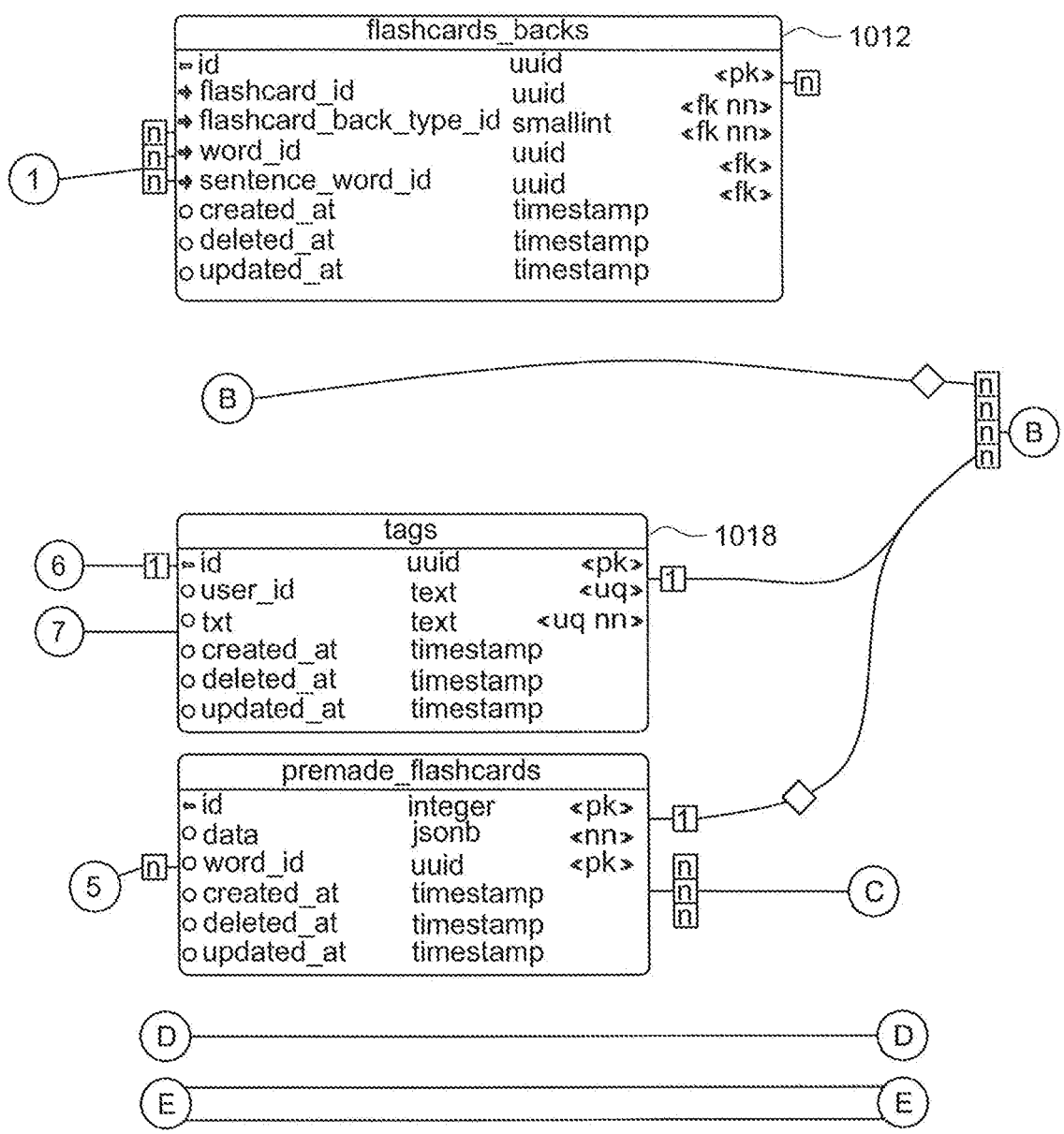
Figure 10D:
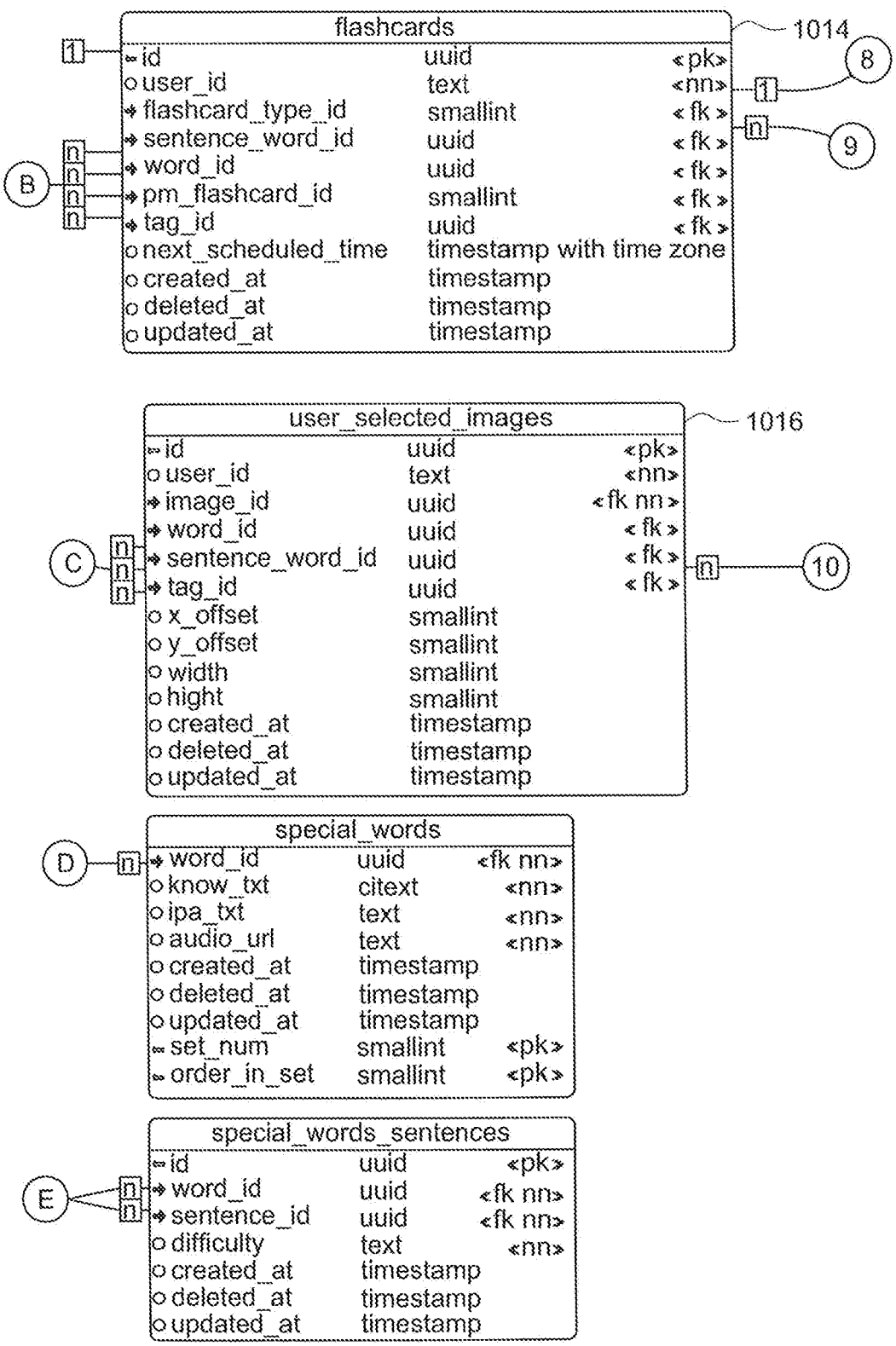
Figure 10E:
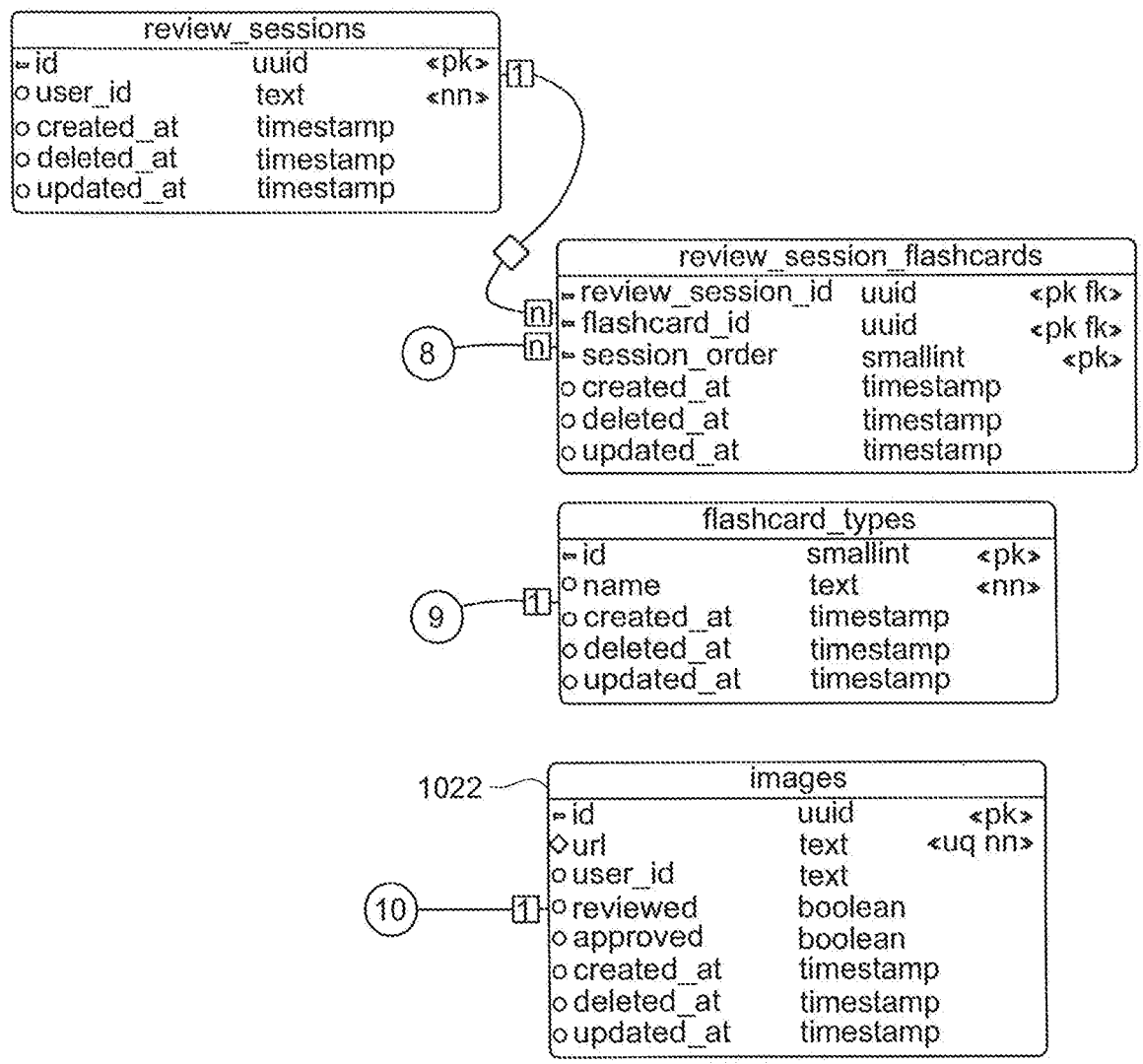

A high level flow of certain elements of a sentence card display operation on the client side is shown in FIG. 8. When the client is to show a sentence card, such as during a flashcard review session, a card request is issued. (Step 802). The words in the sentence are made available as an ordered list (step 804). Meta-data for the sentence that may impact display can be retrieved, which data could include meta-data for each word in the sentence. (Step 806). The sentence can optionally be built on a word-by-word basis with each word independently formatted (step 808). In addition, the image(s) linked to that flashcard are retrieved (step 810). Defined mnemonics, if any, for the card or for card categories as indicated by any tags are retrieved and the card the appropriate card display attributes are selected for defined mnemonics as appropriate (steps 812, 814). The sentence and images are displayed on in the appropriate card format (step 816).

Flashcards can be presented using a "Spaced Repetition System" algorithm based system, such as a Supermemo 2, Supermemo 4, or Supermemo 17 algorithms. In a basic configuration, new flashcards are presented to a user and the user is asked whether they know what's on the back side of a flashcard. The user then signals the program, such as by tapping or clicking on the card, to reveal the back side. The user then self-reports whether they were correct, e.g., by selecting a "Correct" or "Incorrect". Button or by swiping the card left or right. Incorrect cards are repeated during the same session until the user presses 'correct'. Correct cards are tagged to be shown again during a flashcard review that occurs after at least a specified period of time has passed. For example, a card that started 'incorrect' and then changed to 'correct' in the same session can be set to an interval of 4 days so that the system will not present that card to the user until 4 days have passed (assuming nothing has been overridden). For an old card that is being shown (e.g., 4 days or more after a prior showing), if the user signals they are incorrect, the card tested later on in the same session until the user presses 'correct'. Interval until the next showing is reduced to 4 days or 20% of the previous interval, whichever is higher. If, instead, the user is correct when the card is reshown, the card interval is increased to 1.5-2× the current interval.

Review cycles are preferably relatively short (such as 5-10 minutes long) and contain old and some new cards. The user can complete multiple cycles if they wish to study a language for a while each day. When additional reviews are pending, the system can suggest a "bonus review session" to help clear out backlogs of review cards without making the user feel overwhelmed.

The system can also be provided with an audio-only, hands-free flashcard mode of operation. A text-to-speech program can be used to read relevant information from the cards and voice recognition used to determine if the answer is correct. For example, the system can read the single word on the card, the definition of the word, and then an audio fill-in-the blank sentence. For words and sentences known in advance, the audio can be prerecorded. The results (correct or not) are processed similarly to regular cards to adjust the schedule with which the audio-cards are presented. This overall process allows for a hands-free interactive flashcard testing that can be done without using hands or eyes so the user can do it while driving, at the gym, etc.

According to another feature, the system can identify cards that are easy or hard for the user and adjust its behavior accordingly. Card ease can be identified based on both the frequency at which the card is answered correctly or incorrectly as well as the response time. If a user responds correctly to a question rapidly several times in a row, then the program can mark that word as 'easy'. If the user takes a long time on a question, the program will mark that word as 'hard'. Hard cards will show up more frequently than easy ones. If a user repeatedly forgets the meaning of a certain word in a sentence flashcard the program can automatically suggest that the user learns additional sentences containing the same word. If such other sentences are already available, they can be added to the user's flashcard deck automatically. If a user repeatedly answers a given card quickly and correctly, the system will recognize that the card would provide more pedagogical value to the user if it were more difficult, and take steps to make the content appear less familiar. For instance, the way in which the card content is displayed can be altered so that the text appears unfamiliar. For example, the font size, style, and spacing of the text displayed on the card can be adjusted so that the text appears unfamiliar. If a user repeatedly forgets a word, the system may alternatively suggest adding mnemonic information to that flashcard, such as a personal note, or new tag image to help remember its grammatical gender.

The system can also be configured to identify when cards in a deck are related. For example, flashcards may be generated for each word in a given phrase or sentence. If related cards are identified, the system will separate them to the extent possible so that the cards are not displayed immediately after each other. The sequence of display can also be altered.

Yet a further aspect of the invention is autolinking new definitions to old cards and providing a multi-back flashcard presentation. Where the user makes multiple flashcards for the same word, the system can automatically link them together. When the flashcard with that word displayed on the front side is flipped, the system can present all of the definitions, sentences, or other 'back side' content when the card is flipped. Thus, the card will have only one front but multiple backs that user can page through, scroll, or otherwise review. As an example, a user may define one card for the word "set" (a set of utensils) and later define another flashcards for "set" as in a set of tennis. The system can link the cards together automatically, so that if you see a flashcard that says "set" in the front, the user will see both definitions on the back side of the flashcards. A similar process can be used for words that appear in multiple different sentences. Preferably, the various back-sides of the cards are linked together and displayed as a single 'page' that the user can scroll through. The back-sides can be linked horizontally or vertically. The scrolling can start with the first card and end with the last or the last card can transition back to the first in a loop. The order in which the back side of the cards are presented can be predefined, such as the order in which the cards were defined or in order of frequency. The order can also be varied, wherein the order of the back-sides portions are arranged when the card is flipped a first time is different from the order in which the back sides are arranged when the card is flipped a second time.

Yet a further aspect of related flashcards involves words that sound very similar when spoken, such as niece/knees or caro/carro or, in a more difficult example sous[French] vs. su [French] or vs. Sue. Sound files of such closely related words can be played, .e.g., at random, and a user is asked to choose which word they heard. This can improve a user's ability to hear foreign sounds. The flashcards for minimal pair words can also be linked so that if a user gets one incorrect, (i.e., "Sue"), the linked card (i.e., "sous") has its interval reset as well.

In a particular implementation, the system will allow users to also add their own content, such as new sentences, work with live tutors, watch videos, and receive additional materials. Users can browse sentences and the system can also present to a user information about sentences including how many other users are also using this sentence, whether or not there is a recording available, etc. Sentences can have a discussion forum attached to them, where users can ask questions about grammar and staff native speakers will answer them. When browsing sentences, the number of user comments for each sentence can be indicated.

FIGS. 9A-9F show a high-level summary flow diagram for a particular implementation of the system that illustrates various features and functions that can be implemented in a preferred embodiment.

According to a further aspect of the invention, an improved database architecture is provided. In a conventional system in which each card is simply stored as a separate discrete, the volume of data can be significant and searching across cards and user complex. A system that has 10,000 users each with 2,000 sentence cards would need to store 20,000,000 sentences. Breaking each sentence down further into its component words using a conventional relationship database can require storage of 100,000,000 words or more.

The improved architecture provides flexibility needed to manage and search multiple sets of words and sentences for a large number of users and sentences while having a storage-efficient implementation that permits horizontal scaling while supporting the search types useful for the system and allowing for a simpler sharing of data across cards and users The architecture is selected to allow for efficient searching by the server 20 of a database 30 that can contain all of the word, sentence, and card data and metadata for all users of a given language. The architecture is structured to support a set of main search types that may be needed in different use scenarios more efficiently than a conventional generic relational or flat database: Various supported search types can include:

word(/rootword)→sentence (all)
word(/rootword)→sentence (only my inventory)
word(/rootword)→flashcard (only my inventory)
sentence→flashcard (only my inventory)
word(/rootword)→tag
tag→word(/rootword) (all)?
tag→word(/rootword) (only my inventory)
tag→flashcard FIGS. 10A-10E set forth an improved preferred database schema for use with a language fluency system such as disclosed herein. The names assigned to the various database objects and data stored those objects is illustrative and other names can be used. With reference to FIGS. 10A-10E, sentence data is stored hierarchically. Each full sentence for each user is represented as a Sentence object 1002. The Sentence object 1002 has a unique ID and also identifies the user ID that it is associated with. Multiple Sentence objects 1002 can be defined for each user. A Sentence object 1002 is linked to a number of Sentence_Words objects 1004 each having their own ID and also indicating the sentence ID that they link to. Sentence_Words objects 1004 can also contain the text of the word to learn (e.g., foreign language) and the known meaning of the word (e.g., native language) as well as a root word and whether the word in the sentence is abstract. If the particular sentence word is a root, then the root field can be the same as word itself. This object can also store the order in which the words appear in the sentence. A Sentence_Words object 1004 is linked to Words object 1006 for each word the sentence. Each discrete system word has its own Words object 1006 having a unique ID.

Figure 12B:
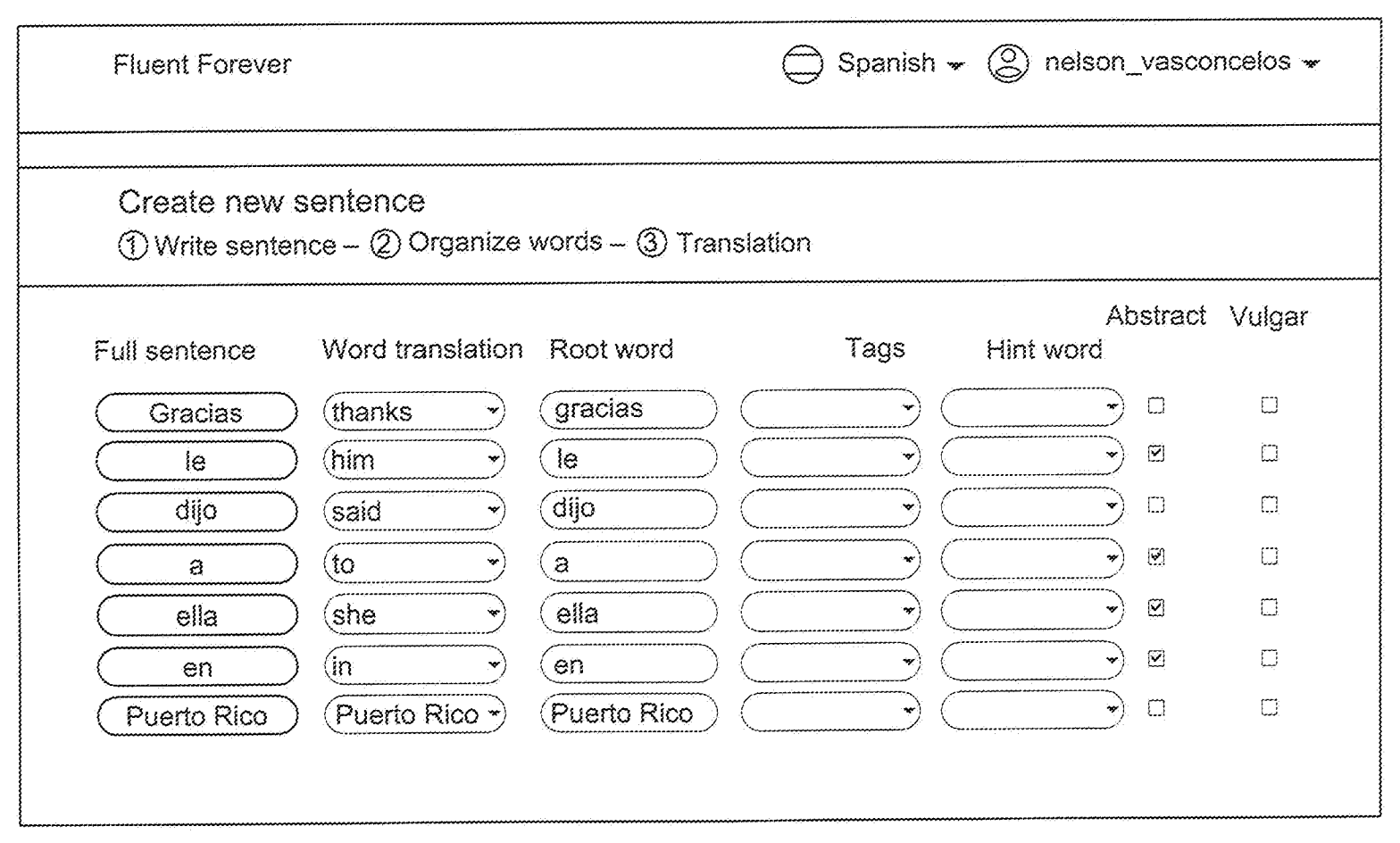

FIGS. 12A and 12B are sample input screens that can be use used to create sentences for storage in the database. The entered sentence is divided into words and a user is able to edit the divisions to separate each different word and also to indicate characters that precede or follow a word and should be displayed but are not part of the word itself, such as punctuation. After a sentence has been so-divided, data for each of the words is collected. For each word, a translation is provided, the root word identified if there is one, and whether the word as used in the sentence is abstract. Other data can also be specified, such as tags for the word (such as masculine or feminine), and a word that can be provided as a hint.

The system can provide suggested values for the various fields. In order to simplify and speed up sentence entry for users, the system can use statistics about existing sentences in the database to auto-populate many of the sentence entry fields, such as 'root word', 'abstract', and 'tags'. An automated translation service (including a third party service accessible over the internet) can also be queried to automatically supply translation suggestions.

In an implementation, database content is analyzed and used to auto-suggest root words and suggest translations for future sentence input. This process speeds up input and increases accuracy. It also makes it more likely for the database to remain homogenous and high quality (i.e., if 90% of users put 'go' as the root of 'went' and 'goes' and 10% of users put 'to go' as the root of those words, then the system can auto-suggest 'go'. Over time, the database entries will converge on the correct entry 'go' instead of 'to go').

There are various ways in which the system can determine if a word is 'abstract'. In one embodiment, the word is explicitly flagged as abstract during sentence entry. In a second embodiment, the system can monitor user behavior when selecting images for flashcards. If a word is initially not flagged as abstract, then when a user wishes to learn that word, the system will use its root word as a search term for a GIS. A user can then either choose one of the results provided by the GIS or initiate a custom search with different search terms. If a threshold of users do not select from one of the proposed GIS-provided images for a particular word, the system can automatically flag that as 'abstract' in that sentence. In addition, it can also auto-suggest flagging that word as 'abstract' when users input a new sentence in the future containing that word. The threshold can be a predefined number, a predefined minimum percentage, or a combination of both (such as more than a minimum threshold percentage as long as there are greater than a minimum number of users in the sample).

Aside from the input screen content in FIGS. 12A and 12B, the interface can also be configured to show suggestions for discussion topics between a tutor and a student user, based upon what vocabulary the student has already indicated is 'known'. In one implementation, a student/tutor pair may receive the instruction: "Create a personal sentence for the word 'tierra'", where 'tierra' is the next word on that student's list of words to learn. Such a system of auto-suggesting content to discuss can be used to rapidly create new databases of words and sentences for new languages. For instance, if ten independent students are working with tutors to learn Greek, the system may give different suggestions to those ten students; to the first student, it may auto-suggest creating sentences for words 1-100 of a predefined list of words, such as the 625 Word List noted above, and to the second student, it may auto-suggest creating sentences for words 101-200. In this way, a small group of students and tutors can more rapidly build a database of sentences for the most commonly used words in a language.

The system can also be used to allow tutor/student pairs to create data needed for pronunciation flashcards. In addition, by giving different students the same content suggestions (e.g., once users have generated sentences for all words within a predefined list, such as out 625 Word list, the system can have multiple users create sentences and translations for words 1-100 in that list), the system can compare input from multiple users to determine quality and agreement in terms of word translations. In this way, the system can create high quality databases of content for new languages without centralized input from a single translator or linguist.

Returning to FIGS. 10A-10E, the Sentence_Words object 1004 is linked to other objects including Sentence_Word_Tags objects 1010 that specify tags for the various words which tags are individually defined in a linked Tags object 1018, and Flashcards objects 1014 and Flashcard_Backs objects 1012 that define the various flashcards that are available for a given word in a given sentence.

A User_Words object 1008 is used to store data indicating each word that the user has indicated they already know. A User_Words object 1008 indicates the User ID and links to Word objects 1006. Word objects 1006 have their own ID and each discrete word that is defined in the system has its own object.

The User_Selected_Image object 1016 contains the information that identifies each of the images that the user has selected for display on a given card. The User_Selected_Image object 1016 and each Word object 1006, Sentence_Words object 1004 and Tags object 1018 that has been associated with that given object are linked to each other. The User_Selected_Image object 1016 can also be linked to an Images object 1022 that, similar to the Word objects 1006, represents each unique image that has been defined and includes a URL and other information for that image.

The number of links to various objects, such as Word objects 1006 can be used to quickly determine the frequency that each word is used across the various sentences. This information can be stored in Word_Frequencies object 1020 for easy reference by the Server when selecting a batch of words for a given user.

In addition to user specific data, the system will also store information for the predefined words and sentences, such as the 625 high frequency words and the sentences selected for those words. Data can be stored as a hierarchical json objects. FIG. 11 is an example of sample json object 1100 for a sentence "Gracias, le dijo a ella en Puerto Rico" and its English translation ("Thank you, he told her in Puerto Rico.") that has been predefined for the word "gracias". Certain aspects of the database structure are discussed herein. Other aspects will be apparent to one of ordinary skill in the art. The sentence is linked to the source word "gracias", indicates the sentence to learn and the known translation, and then contains the word-specific information for each word in sequence, including identifying word roots (which can be the same as the main word), preceding and following non-word text, whether the word is abstract, and other information.

The hierarchical database structure disclosed herein reduces duplication of word, sentence, tag, image, and other data in the database when setting up sentence cards, word cards, tags, and other information for each user and where the database is used to store a large volume of custom flashcard information for a large number of users. The database object linking is bi-directional making it easy to both identify flashcards for a given user and to execute searches, for example, searching for all sentences that have a specific word and searching for all images that users have associated with a given word.

Other Objects in the database architecture shown in FIGS. 10A-10E operate similarly to the ones disclosed above and their operation in the context of the overall system as described will be apparent to those of ordinary skill in the art.

While the present invention has been described in connection with a specific application, this application is exemplary in nature and is not intended to be limiting on the possible applications of this invention. It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

What is claimed is:

1. A method for teaching a plurality of users a foreign language, the method comprising steps of:

providing a server connected to a network and accessible to a plurality of client devices through the network;

providing a database accessible to the server, the database comprising a plurality of Word Objects each specifying a different respective word in the foreign language and a plurality of User_Words Objects, each User_Words Object linked to a particular Word Object and associated with a specific one of the plurality of users, and a plurality of Flashcards Objects each linked to the particular Word Object and associated with the specific one of the plurality of users;

receiving from a client device associated with a first user a first request for recommended pictures to be shown on a computer generated first flashcard for a first word;

identifying in response to the first request a first group of recommended pictures, the first group of recommended pictures identifying pictures previously selected by other users for the first word;

sending from the server to the client device, in response to the first request, recommended picture information comprising the first group of recommended pictures;

receiving from the client device a selected picture message identifying a selected picture for the first word;

storing in the database picture information for the selected picture;

storing in the database a Flashcards Object associated with the first user and linked to the Word Object for the first word and to information about the selected picture;

receiving from the client device a flashcard review request from the first user; and sending, in response to the flashcard review request, flashcard data extracted from the database, the flashcard data identifying a particular word and the first user's selected picture for the particular word, the flashcard data usable by the client device to display a flashcard with the particular word and the user's selected picture for the particular word.

2. The method of claim 1 wherein the picture information comprises a URL.

3. The method of claim 1, wherein the picture selection for the first word identifies a picture that is not one of the recommended pictures.

4. The method of claim 1, further comprising the steps of:
generating in response to the first request an image search query for the first word;
issuing the query to an image search engine;
receiving image search results from the image search engine;
selecting a second group of recommended pictures, the second group of recommended pictures identifying at least one picture from the image search results; and
the recommended picture information further comprising the second group of recommended pictures.

5. The method of claim 1, wherein the database further comprises a plurality of Images Objects each containing a URL for a specific picture, and a plurality of User_Selected_Images Objects, each User_Selected_Images Object linked to a particular Images Object and associated with a specific one of the plurality of users; and
the step of storing in the database picture information for the selected picture comprising storing in a User_Selected_Images Object associated with the first user and linked to the Word Object for the first word and linked to a particular Images Objects containing the URL for the selected picture.

6. The method of claim 1, further comprising the steps of:
initiating at the client device a flashcard creation process;
displaying on a display of the client device a list of words for which flashcards can be generated;
receiving through a user interface of the client device an input from the first user selecting a word from the list of words;
sending the first request from the client device to the server, the selected word being the first word;
receiving at the client device the recommended picture information from the server;
displaying on the display at least some of the pictures identified in the recommended picture information;
receiving through the user interface an identification of the selected picture; and
sending the selected picture message to the server.

7. The method of claim 6, further comprising the steps of:
initiating at the client device a flashcard review process;
sending the flashcard review request from the client device to the server;
receiving at the client device the flashcard data from the server;
the client device generating a flashcard image on the display using the flashcard data; and
the particular word being displayed on one of first and second side of the flashcard and the user's selected picture for the particular word being displayed on the one of first and second side of the flashcard.

8. The method of claim 6, further comprising the steps of:
initiating at the client device a flashcard review process; and
sending the flashcard review request from the client device to the server; receiving at the client device the flashcard data from the server, the client device generating a flashcard image on the display using the flashcard data; at least part of a sentence being displayed on one of first and second side of the flashcard and the selected picture for the particular word in the sentence being displayed on the one of first and second side of the flashcard.

9. A method for teaching a plurality of users a foreign language, the method comprising steps of:
providing a server connected to a network and accessible to a plurality of client devices through the network;
providing a database accessible to the server, the database comprising a plurality of sentences in the foreign language, each sentence comprises a plurality of words;
receiving from a client device associated with a first user a first request for recommended pictures to be shown on a computer generated first flashcard for a first word in a first sentence;
identifying in response to the first request a first group of recommended pictures, the first group of recommended pictures identifying pictures previously selected by other users for the first word in a context of the first sentence;
sending from the server to the client device, in response to the first request, recommended picture information comprising the first group of recommended pictures;
receiving from the client device a selected picture message identifying a selected picture for the first word in the first sentence;
storing information about the first flashcard including picture information for the selected picture;
receiving from the client device a flashcard review request from the first user; and
sending, in response to the flashcard review request, flashcard data extracted from the database, the flashcard data including a particular sentence, an identification of a particular word in the particular sentence, and the picture information for the selected picture for the particular word in the particular sentence, the flashcard data usable by the client device to display a flashcard for the particular sentence, the particular word in the particular sentence, and the selected picture for the particular word in the particular sentence.

10. The method of claim 9, the database further containing abstract flag data indicating for each particular word in each sentence whether the particular word as used in a respective sentence is abstract, the method further comprising steps of:
generating in response to the first request an image search query for the first word, the query comprising one of the word and a root word associated with the first word if the abstract flag for the first word is not set, the query otherwise comprising at least one other word in the first sentence;
issuing the query to an image search engine;
receiving image search results from the image search engine;
selecting a second group of recommended pictures, the second group of recommended pictures identifying at least one picture from the image search results; and
the recommended picture information further comprising the second group of recommended pictures.

11. The method of claim 10, wherein if the abstract flag for the first word is set the query comprises at least one of a word randomly selected from other words in the first sentence that are not flagged as abstract and a root word associated with the randomly selected word.

12. The method of claim 10, the database further comprising:
a plurality of Sentence Objects each specifying a particular one of the plurality of sentences;
a plurality of Sentence_Words Objects, each Sentence_Words Object linked to a particular one of the plurality of sentences and identifying a specific word in the linked sentence and for the specific word an order position in the sentence, an associated root word and the abstract flag;
a plurality of Images Objects each containing a URL for a specific picture;
a plurality of User_Selected_Images Objects, each User_Selected_Images Object linked to a particular Images Object and associated with a specific one of the plurality of users; and
a plurality of Flashcards objects each associated with a particular flashcard for a particular user;
the step of storing information about the first flashcard comprising the steps of:
storing in a first Flashcards Object associated with the first user a link to a Sentence_Words Object for the first word; and
storing in a first User_Selected_Images Object associated with the first user a link to the Sentence_Words Object for the first word and a link a particular Images Objects containing the URL for the selected picture.

13. The method of claim 9 wherein the picture information comprises a URL.

14. The method of claim 9, further comprising the steps of:
initiating at the client device a flashcard creation process;
displaying on a display of the client device a list of words for which flashcards can be generated;
receiving through a user interface of the client device an input from the first user selecting a word from the list of words, the selected word being the first word;
displaying on the display at least one sentence containing the first word;
receiving through the user interface a selection of the first sentence;
sending the first request from the client device to the server; receiving at the client device the recommended picture information from the server;
displaying on the display at least some of the pictures identified in the recommended picture information; and
receiving through the user interface an identification of the selected picture; and sending the selected picture message to the server.

15. A system for teaching a plurality of users a foreign language, the system comprising:
a server connected to a network and accessible to a plurality of client devices through the network;
a database accessible to the server, the database comprising a plurality of sentences in the foreign language, each sentence comprises a plurality of words; and
the server having a computer processor and storage having software stored therein; the software containing instructions to configure the server to:
receive from a client device associated with a first user a first request for recommended pictures to be shown on a computer generated first flashcard for a first word in a first sentence;
identify in response to the first request a first group of recommended pictures, the first group of recommended pictures identifying pictures previously selected by other users to be shown on respective computer generated flashcards for such other users for the first word in a context of the first sentence;
send to the client device, in response to the first request, recommended picture information comprising the first group of recommended pictures;
receive from the client device a selected picture for the first word in the first sentence;
store in the database information about the first flashcard including picture information for the selected picture;
receive from the client device a flashcard review request from the first user;
retrieve, from the database, flashcard data; and
send, in response to the flashcard review request, flashcard data extracted from the database, the flashcard data including a particular sentence, an identification of a particular word in the particular sentence, and picture information for the selected picture for the particular word in the particular sentence, the flashcard data usable by the client device to display a flashcard for the particular sentence, the particular word in the sentence, and the selected picture for the particular word in the sentence.

16. The system of claim 15, the database further storing for each particular word in each sentence an associated root word and a flag indicating whether the particular word as used in a respective sentence is abstract, the software further comprising instructions to configure the server to:
generate in response to the first request an image search query for the first word, the image search query comprising the associated root word associated with the first word if the abstract flag for the first word is not set, the image search query otherwise comprising one of another word in the first sentence;
issue the image search query to an image search engine;
receive image search results from the image search engine; and select a second group of recommended pictures, the second group of recommended pictures identifying at least one picture from the image search results;

wherein the recommended picture information further comprises the second group of recommended pictures.

17. The system of claim 16, the database further comprising:

a plurality of Sentence Objects each specifying a particular one of the plurality of sentences;

a plurality of Sentence_Words Objects, each Sentence_Words Object linked to a particular one of the plurality of sentences and identifying a specific word in the linked sentence and for the specific word an order position in the sentence, the associated root word and the abstract flag;

a plurality of Images Objects each containing a URL for a specific picture;

a plurality of User_Selected_Images Objects, each User_Selected_Images Object linked to a particular Images Object and associated with a specific one of the plurality of users; and a plurality of Flashcards objects each associated with a particular flashcard for a particular user.

* * * * *